US012794291B2

(12) United States Patent
Konings et al.

(10) Patent No.: US 12,794,291 B2
(45) **Date of Patent: *Nov. 10, 2026**

(54) ANNULAR AXIAL FLUX MOTORS

(71) Applicant: Magic Leap, Inc., Plantation, FL (US)

(72) Inventors: Arno Leon Konings, Austin, TX (US); Charles Robert Schabacker, Plantation, FL (US); Jason Donald Mareno, Raleigh, NC (US)

(73) Assignee: Magic Leap, Inc., Plantation, FL (US)

( * ) Notice: Subject to any disclaimer, the term of this patent is extended or adjusted under 35 U.S.C. 154(b) by 276 days.

This patent is subject to a terminal disclaimer.

(21) Appl. No.: 18/616,809

(22) Filed: Mar. 26, 2024

(65) Prior Publication Data

US 2024/0235299 A1 Jul. 11, 2024

Related U.S. Application Data

(63) Continuation of application No. 17/612,658, filed as application No. PCT/US2019/068371 on Dec. 23, 2019, now Pat. No. 11,973,375.

(Continued)

(51) Int. Cl.

| | |
|---|---|
| ***H02K 1/2792*** | (2022.01) |
| ***H02K 1/2795*** | (2022.01) |
| ***H02K 3/26*** | (2006.01) |

(52) U.S. Cl.

CPC ......... *H02K 1/2795* (2022.01); *H02K 1/2792* (2022.01); *H02K 3/26* (2013.01); *H02K 2211/03* (2013.01)

(58) Field of Classification Search

CPC ............... H02K 1/2793; H02K 1/2795; H02K 1/2796; H02K 1/2798; H02K 37/12;

(Continued)

(56) References Cited

U.S. PATENT DOCUMENTS 4,661,736 A 4/1987 Kawada et al.
4,676,605 A 6/1987 Toda et al.

(Continued)

FOREIGN PATENT DOCUMENTS

CN 104956573 9/2015
CN 105071573 11/2015

(Continued)

OTHER PUBLICATIONS

DE-102012221910-A1 Machine Translation (Year: 2014).*

(Continued)

*Primary Examiner* — Oluseye Iwarere
*Assistant Examiner* — Masoud Vaziri
(74) *Attorney, Agent, or Firm* — Fish & Richardson P.C.

(57) ABSTRACT

An annular axial flux motor includes a rotor mounted on an annular subsection of a rotatable cam ring and a stator mounted on an annular subsection of a carrier frame. The rotor includes two Halbach arrays of permanent magnets spaced from each other on the cam ring along an axial direction. The stator includes multiple phase electrical windings printed on multiple layers of a printed circuit board (PCB) that are stacked along the axial direction. The multiple layers are positioned between the Halbach arrays, with active side of the Halbach arrays facing to opposite sides of the multiple layers. The Halbach arrays are configured to generate a symmetrical magnetic field and the multiple phase electrical windings are configured to have a same rotor-dependent torque constant, such that the stator can generate a constant torque to rotate the rotor and the cam ring within a finite travel range.

18 Claims, 21 Drawing Sheets

Related U.S. Application Data

(60) Provisional application No. 62/852,940, filed on May 24, 2019.

(58) Field of Classification Search
CPC ........ H02K 37/125; G02B 26/00; G02B 7/00; G02B 7/04; G02B 7/10
See application file for complete search history.

(56) References Cited

U.S. PATENT DOCUMENTS

| | | | | | |
|---|---|---|---|---|---|
| 5,424,793 | A | | 6/1995 | Fukushima et al. | |
| 5,978,602 | A | | 11/1999 | Toyofuku et al. | |
| 8,149,520 | B2 | | 4/2012 | Kurosawa | |
| 9,671,566 | B2 | | 6/2017 | Abovitz et al. | |
| 9,791,700 | B2 | | 10/2017 | Schowengerdt | |
| 10,262,462 | B2 | | 4/2019 | Miller et al. | |
| 10,459,231 | B2 | | 10/2019 | Miller et al. | |
| 2003/0020353 | A1 | * | 1/2003 | Lopatinsky | H02K 7/14 310/208 |
| 2003/0127317 | A1 | | 7/2003 | Cope et al. | |
| 2003/0205946 | A1 | * | 11/2003 | Maslov | H02K 21/22 310/254.1 |
| 2005/0174657 | A1 | * | 8/2005 | Honsho | G02B 7/08 359/819 |
| 2006/0119218 | A1 | | 6/2006 | Doshida et al. | |
| 2009/0323208 | A1 | * | 12/2009 | Kurosawa | G03B 3/10 310/156.43 |
| 2011/0012440 | A1 | * | 1/2011 | Toyota | H02K 1/2792 310/152 |
| 2014/0203679 | A1 | | 7/2014 | Klontz et al. | |
| 2015/0244219 | A1 | | 8/2015 | Woolmer | |
| 2016/0004102 | A1 | | 1/2016 | Nisper et al. | |
| 2016/0072362 | A1 | | 3/2016 | Kube | |
| 2016/0329795 | A1 | * | 11/2016 | Ricci | H02K 1/2798 |
| 2017/0047792 | A1 | | 2/2017 | Klassen et al. | |
| 2018/0017757 | A1 | | 1/2018 | Bohn | |
| 2018/0191215 | A1 | | 7/2018 | Long | |
| 2018/0198341 | A1 | * | 7/2018 | Schuler | H02K 3/26 |
| 2018/0248454 | A1 | | 8/2018 | Ji et al. | |
| 2018/0278186 | A1 | | 9/2018 | Morse et al. | |
| 2018/0356639 | A1 | | 12/2018 | Schaefer et al. | |
| 2020/0091786 | A1 | * | 3/2020 | Gery | H02K 3/32 |
| 2021/0141212 | A1 | | 5/2021 | Jacoby et al. | |

FOREIGN PATENT DOCUMENTS

| | | | | | |
|---|---|---|---|---|---|
| CN | 106787293 | A | | 5/2017 | |
| CN | 107482841 | | | 12/2017 | |
| CN | 107482841 | A | * | 12/2017 | H02K 7/025 |
| CN | 108173384 | A | | 6/2018 | |
| CN | 108432091 | | | 8/2018 | |
| CN | 108808921 | A | | 11/2018 | |
| DE | 102012221910 | A1 | * | 6/2014 | H02K 41/031 |
| DE | 112016003201 | T5 | * | 4/2018 | H02K 3/26 |
| EP | 3386074 | | | 10/2018 | |
| JP | S61273142 | A | | 12/1986 | |
| JP | 2003-164131 | | | 6/2003 | |
| JP | 2008104278 | A | | 5/2008 | |
| JP | 2011-081426 | | | 4/2011 | |
| JP | 5515478 | B2 | * | 6/2014 | H02K 41/031 |
| WO | WO 2011/055124 | | | 5/2011 | |
| WO | WO 2016/152559 | | | 9/2016 | |
| WO | 2019033696 | A1 | | 2/2019 | |

OTHER PUBLICATIONS

JP-5515478-B2 Machine Translation (Year: 2014).*

CN-107482841-A Machine Translation (Year: 2017).*

DE-112016003201-T5 Machine Translation (Year: 2018).*

Office Action in Chinese Appln. No. 201980096732.6, dated May 1, 2024, 10 pages (with English translation).

Office Action in Chinese Appln. No. 201980096732.6, mailed on Dec. 18, 2024, 13 pages (with English translation).

English Machine Translation for CN 104956573A, Sep. 30, 2015, 20 pages.

English Machine Translation for CN 107482841A, Dec. 15, 2017, 8 pages.

English Machine Translation for CN 108432091A, Aug. 21, 2018, 16 pages.

English Machine Translation for JP 2003-164131A, Jun. 6, 2003, 10 pages.

English Machine Translation for JP 2011-081426A, Apr. 21, 2011, 17 pages.

International Search Report and Written Opinion in International Appln. No. PCT/US2019/068371, mailed Mar. 5, 2020, 13 pages.

Notice of Allowance in Japanese Appln. No. 2021-569461, dated Feb. 2, 2024, 6 pages (with English translation).

Office Action in Japanese Appln. No. 2021-569461, dated Oct. 3, 2023, 14 pages (with English translation).

Partial European Search Report in European Appln. No. 19931389, dated Jun. 29, 2022, 17 pages.

Notice of Allowance in Chinese Appln. No. 201980096732.6, mailed on Mar. 25, 2025, 9 pages (with English translation).

Office Action in European Appln. No. 19931389.1, mailed on Jan. 12, 2026, 10 pages.

* cited by examiner

ANNULAR AXIAL FLUX MOTORS

CROSS REFERENCE TO RELATED APPLICATIONS

This application is a continuation of U.S. patent application Ser. No. 17/612,658, filed Nov. 19, 2021, which is a National Stage Application of International Application No. PCT/US2019/068371, filed Dec. 23, 2019, which claims priority under 35 U.S.C. § 119 to U.S. Provisional Patent Application No. 62/852,940, filed May 24, 2019, and entitled "VARIABLE FOCUS ASSEMBLIES," the entire contents of which applications are incorporated by reference herein.

TECHNICAL FIELD

This disclosure relates generally to electric motors, particularly to annular axial flux motors.

BACKGROUND

It is desirable that mixed reality (MR) or augmented reality (AR), near-eye displays be light-weight, low-cost, have a small form-factor, have a wide virtual image field of view, and be as transparent as possible. In addition, it is desirable to have configurations that present virtual image information in multiple focal planes to be practical for a wide variety of use-cases without exceeding an acceptable allowance for vergence-accommodation mismatch.

Components of the displays can be driven by actuators. In some cases, to get an actuator that can provide a required travel range, a form factor, a lifetime, and a peak torque/force required to drive a liquid lens, a heavy magnetic motor is integrated into a mechanical actuator, which may be undesirable for the light-weight displays. In some other cases, a micro-motor is used in a mechanical actuator to satisfy the weight requirement of the displays. The mechanical actuator can include a cam ring with axial cutouts. The cutouts are slanted at an angle and guide pins connected to another annular (e.g., a shaper ring) that is interior to the cam ring. When the cam ring is rotated, the interior ring moves axially and actuates a liquid lens that is axially interior to the cam ring. A pin that sticks out axially from the cam ring can be driven by linkage attached to the micro-motor. However, the micro-motor may not meet the required output torque and power specifications.

SUMMARY

One aspect of the present disclosure features an annular axial flux motor including: a rotor including an array of permanent magnets mounted on a first annular subsection of a rotatable structure, the array of permanent magnets extending along a circumferential direction (or a tangential direction) of the first annular subsection and being configured to have a stronger magnetic field on an active side of the array than an inactive, opposite side of the array with respect to an axial direction of the first annular subsection; and a stator including multiple layers of printed electrical windings on a printed circuit board (PCB) mounted on a second annular subsection of a carrier that corresponds to the first annular subsection, the electrical windings extending along the circumferential direction, the multiple layers of the PCB being stacked along the axial direction, the active side of the array of permanent magnets facing to one side of the multiple layers of the PCB and being spaced with a nominal gap. The stator is configured to be energized to generate a torque, e.g., a constant torque, to drive the rotor with the rotatable structure to rotate within a finite travel range with respect to the carrier.

In some implementations, the array of permanent magnets is a Halbach array. The Halbach array can include periodic units of permanent magnets arranged on the first annular subsection along the circumferential direction, each of the periodic units including rows of magnet pole pairs.

In some examples, each of the periodic units includes four rows of magnet pole pairs, adjacent rows being separated from one another with a magnetic space along the circumferential direction, each magnet pole pair including an N pole and an S pole. The four rows include: a first row having N pole and S pole vertically and sequentially stacked along the axial direction, a second row having S pole and N pole horizontally and sequentially stacked along the circumferential direction, a third row having S pole and N pole vertically and sequentially stacked along the axial direction, and a fourth row having N pole and S pole horizontally and sequentially stacked along the circumferential direction.

In some implementations, the rotor includes two arrays of permanent magnets mounted on the first annular subsection and spaced from each other along the axial direction, the multiple layers of printed electrical windings on the PCB are arranged between the two arrays of permanent magnets, active sides of the two arrays facing to opposite sides of the multiple layers with respect to the axial direction, and nominal gaps between the active sides of the respective Halbach arrays and the opposite sides of the multiple layers having a same width along the axial direction.

The two arrays of permanent magnets can be configured to generate a symmetrical magnetic field with respect to a center of the multiple layers of the PCB, and an axial component of the symmetrical magnetic field along the axial direction can be substantially larger than a tangential component of the symmetrical magnetic field along a tangential direction of the first annular subsection. In some examples, each of the two arrays of permanent magnets is a respective Halbach array, and the respective Halbach arrays have different arrangements of magnetic poles and are configured to have the active sides opposite to the two sides of the multiple layers of printed electrical windings. In some examples, the stator includes multiple phase electrical windings, and each of the multiple phase electrical windings of the stator is configured to have a same rotor-dependent torque constant, such that the stator is configured to generate the constant torque to drive the rotor.

The electrical windings can have a height along a radial direction of the structure that is substantially same as a height of the array of permanent magnets along the radial direction. The electrical windings can be configured such that a winding period of the electrical windings corresponds to a magnetic period of a magnetic field of the rotor.

In some implementations, the stator includes 2-phase electrical windings configured to be driven with sinusoidal drive currents with a phase difference of $\pi/2$. Each of the multiple layers can correspond to a respective phase electrical winding, and the respective phase electrical windings with different phases can alternate in the multiple layers. The two phase electrical windings can have a same winding pattern and are offset by a quarter of a winding period.

The multiple layers of printed electrical windings can include a first layer, a second layer, a third layer, and a fourth layer sequentially stacked together along the axial direction, and printed electrical windings on the first layer and the third layer can be formed by a first continuous wire to be a first phase electrical winding, and printed electrical windings on the second layer and the fourth layer can be formed by a second continuous wire to be a second phase electrical winding.

In some examples, the first wire is printed starting from an input port of the first layer, extending along a first path on the first layer to a first via, through which the first wire goes to the third layer and extends along a second path on the third layer to a second via, through which the first wire goes back to the first layer and extends along a third path on the first layer to a third via, through which the first wire goes to the third layer and extends along a fourth path on the third layer to a fourth via, through which the first wire goes to the first layer and extends along a fifth path on the first layer to a fifth via, through which the first wire goes to the third layer and extends along a sixth path on the third layer to an output port of the third layer. The first wire extending along the first path, the third path, and the fifth path forms a first electrical winding on the first layer, the first wire extending along the second path, the fourth path, and the sixth path forms a second electrical winding on the third layer, and the first electrical winding and the second electrical winding form the first phase electrical winding. The first electrical winding and the second electrical winding have a same winding pattern offset by a quarter of a winding period, and the first via, the third via, and the fifth via are adjacent to each other, while the second via and the fourth via are adjacent to each other.

In some examples, the electrical windings have a rectangular winding pattern.

In some examples, the electrical windings have a triangular winding pattern. The triangular winding pattern can have a winding angle of 45 degree.

The rotor can be configured to generate a magnetic field having a sinusoidal shape corresponding to positions of magnetic pole pairs of the rotor, and the stator can be configured to be driven by a sinusoidal current varying corresponding to the positions of the magnet pole pairs of the rotor.

In some implementations, the stator includes 3-phase electrical windings configured to be driven with sinusoidal drive currents with $2\pi/3$ out of phase relative to one another.

Another aspect of the present disclosure features a system including: a carrier frame, a cam ring interior to the carrier frame and configured to be rotatable with respect to the carrier frame around an axis along an axial direction, and an annular axis flux motor. The annular axis flux motor includes: a rotor including an array of permanent magnets mounted on a first annular subsection of the cam ring, the array of permanent magnets extending along a circumferential direction of the first annular subsection and being configured to have a stronger magnetic field on an active side of the array than an inactive, opposite side of the array with respect to the axial direction; and a stator including multiple layers of printed electrical windings on a printed circuit board (PCB) mounted on a second annular subsection of the carrier frame that corresponds to the first annular subsection, the printed electrical windings extending along the circumferential direction, the multiple layers of the PCB being stacked with one another along the axial direction, the active side of the array of permanent magnets facing to one side of the multiple layers of the PCB along the axial direction and being spaced with a nominal gap. The stator is configured to be energized to generate a torque, e.g., a constant torque, to drive the rotor with the cam ring to rotate within a finite travel range with respect to the carrier frame.

In some implementations, the system further includes a shaper ring positioned interior to the cam ring and configured to be connected with the cam ring such that a rotational motion of the cam ring with respect to the carrier frame results in an axial motion of the shaper ring with respect to the cam ring along the axial direction. The system can further include a flexible lens membrane configured to be coupled to the shaper ring such that the axial motion of the shaper ring causes a curvature change of the flexible lens membrane. In some examples, the system further includes a liquid lens assembly including incompressible fluid encapsulated between the shaper ring, the flexible lens membrane, a refractive component, and a flexible annular membrane. The incompressible fluid is configured to be pushed towards the flexible lens membrane to cause the curvature change when the shaper ring is axially moved with the axial motion towards the refractive component.

In some implementations, the rotor includes two Halbach arrays of permanent magnets mounted on the first annular subsection and spaced from each other along the axial direction, and the multiple layers of printed electrical windings on the PCB are arranged between the two Halbach arrays, active sides of the two Halbach arrays facing to opposite sides of the multiple layers with respect to the axial direction. The two Halbach arrays can be configured to generate a symmetrical magnetic field with respect to a center of the multiple layers, an axial component of the magnetic field along the axial direction being substantially larger than a tangential component of the magnetic field along a tangential direction of the first annular subsection. The two Halbach arrays can have different arrangements of magnetic poles and be configured to have the active sides facing to the opposite sides of the multiple layers of printed electrical windings.

In some implementations, the stator includes 2-phase electrical windings configured to be driven with sinusoidal currents with a phase difference of $\pi/2$. Each phase electrical windings of the stator can be configured to have a same rotor-dependent torque constant, such that the stator is configured to generate the constant torque to drive the rotor. The 2-phase electrical windings can have a same winding pattern and are offset by a quarter of a winding period. The winding pattern can be rectangular or triangular.

In some examples, the multiple layers of printed electrical windings include a first layer, a second layer, a third layer, and a fourth layer sequentially stacked together along the axial direction, and printed electrical windings on the first layer and the third layer are formed by a first continuous wire to be a first phase electrical winding, and printed electrical windings on the second layer and the fourth layer are formed by a second continuous wire to be a second phase electrical winding.

The rotor can be configured to generate a magnetic field having a sinusoidal shape corresponding to positions of magnetic pole pairs of the rotor, and the stator can be configured to be driven by a sinusoidal current varying corresponding to the positions of the magnet pole pairs of the rotor. The cam ring can be made of a non-ferromagnetic material.

A further aspect of the present disclosure features a method including: inputting respective drive currents into different phase electrical windings of a stator of an annular axial flux motor, the respective drive currents having a phase difference with a predetermined degree with respect to each other, the different phase electrical windings being printed on multiple layers of a printed circuit board (PCB) mounted on a first annular subsection of a carrier frame, the printed electrical windings extending along a circumferential direction of the first annular subsection, the multiple layers being stacked with one another along an axial direction of the first annular subsection; and driving a rotor of the motor that is mounted on a second annular subsection of a cam ring to rotate with a finite travel range about an axis of the cam ring, the second annular subsection corresponding to the first annular subsection, the rotor including two Halbach arrays of permanent magnets that are spaced from each other along the axial direction and extend along the circumferential direction, each of the Halbach arrays being configured to generate a stronger magnetic field on an active side of the Halbach array than an inactive side of the Halbach array with respect to the axial direction. The multiple layers of the PCB are positioned between the two Halbach arrays of the rotor along the axial direction with the two active sides of the Halbach arrays facing to opposite sides of the multiple layers of the PCB. The two Halbach arrays are configured to generate a symmetrical magnetic field with respect to a center of the multiple layers of the PCB along the axial direction. Each phase electrical windings of the stator are configured to have a same rotor-dependent torque constant, such that the stator is energized by the drive currents to generate a constant torque to drive the rotor and the cam ring with respect to the carrier frame.

The method can further include moving a shaper ring mechanically coupled to the cam ring with an axial motion along the axial direction by a rotational motion of the cam ring due to the rotation of the rotor mounted on the cam ring. The method can further include changing a curvature of a flexible lens membrane coupled to the shaper ring by the axial motion of the shaper ring.

In some implementations, the stator includes two phase electrical windings, and the respective drive currents for the two phase electrical windings are sinusoidal currents with a phase difference of $\pi/2$. In some examples, the multiple layers of the printed electrical windings include a first layer, a second layer, a third layer, and a fourth layer sequentially stacked together along the axial direction, and printed electrical windings on the first layer and the third layer are formed by a first continuous wire to be a first phase electrical winding, and printed electrical windings on the second layer and the fourth layer are formed by a second continuous wire to be a second phase electrical winding.

In some implementations, the stator includes three phase electrical windings, and the respective drive currents for the three phase electrical windings are sinusoidal currents with a phase difference of $2\pi/3$.

The rotor can be configured to generate a magnetic field having a sinusoidal shape corresponding to positions of magnetic pole pairs of the rotor, and the respective drive currents can be a sinusoidal current varying corresponding to the positions of the magnet pole pairs of the rotor.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
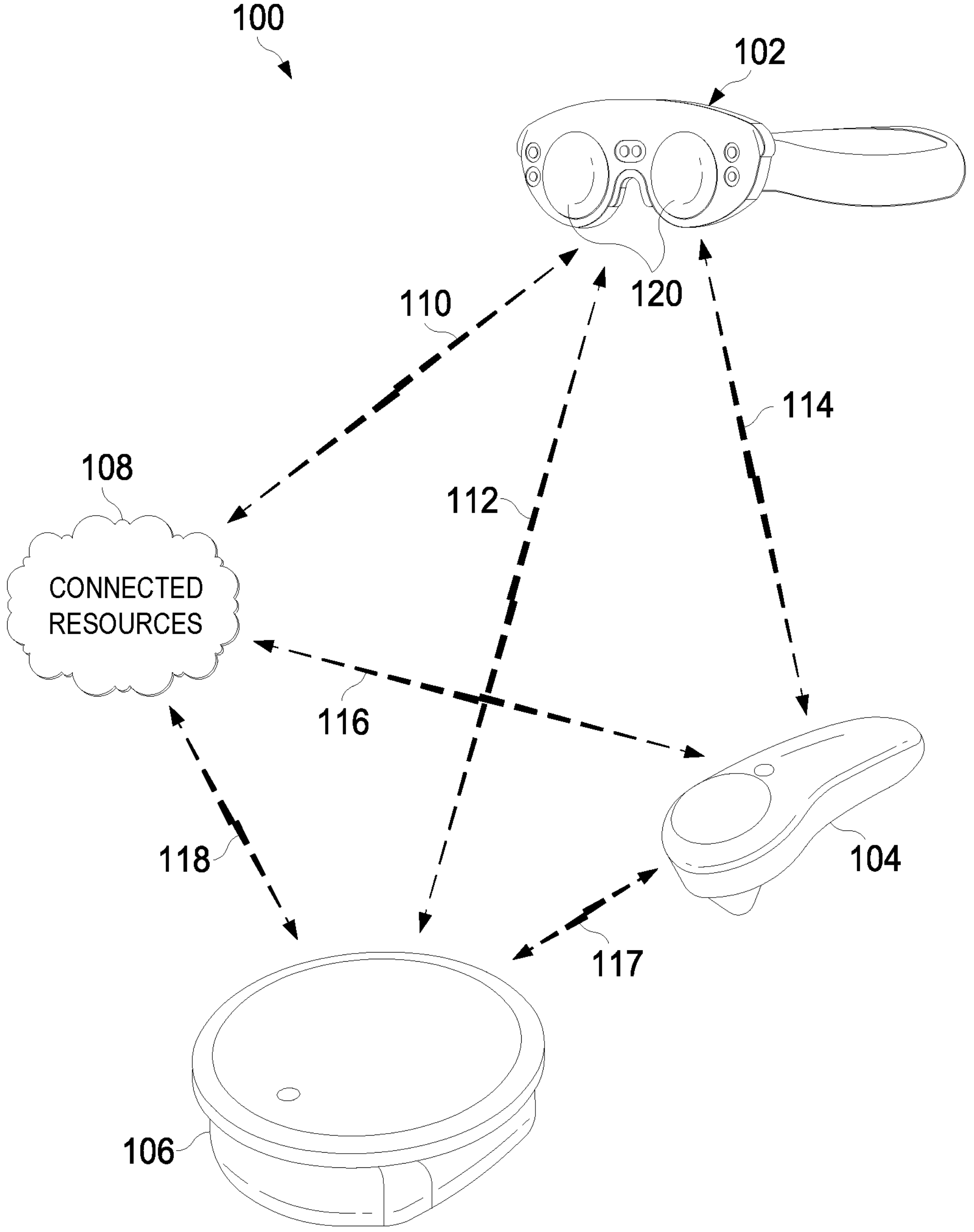
FIG. 1 is a schematic diagram of an example of an augmented reality system.

Implementations of the present disclosure provide a compact coreless annular axial flux motor that can be operated, for example, in a high-torque and low-speed regime instead of a low-torque and high-speed regime. The compact, high-torque motor can be used in a mechanical cam ring based actuation system for driving a liquid lens assembly with a limited travel range in an optical system such as an MR or AR display. Specifically, the cam ring can be converted into a rotor of the motor by embedding one or more arrays of permanent magnets, e.g., a Halbach array, on the cam ring. A stator of the motor can be implemented by printed electrical windings on a printed circuit board (PCB) that is mounted on a carrier frame of the liquid lens assembly. The cam ring is rotatable with respect to the carrier frame. The stator can be implemented with either 2-phase or 3-phase or even more phase electrical windings. The windings can be printed in multiple layers of the PCB.

In some implementations, the arrays of permanent magnets embedded in the cam ring can be placed along an entire circumference or an annular subsection (or an arc) of the cam ring. In some cases, with considerations of form factors of the MR or AR display, the permanent magnets can be placed in an arc of the cam ring that is limited to a certain degree, e.g., less than 120 degrees. That is, the motor is formed not in a full circle, but with a finite or limited arc length, which causes the cam ring to rotate forward and backward within a limited angle, not in a continuous rotation. In some implementations, the motor's windings are implemented as traces on a curved PCB. Multiple winding phases and high winding turn counts can be achieved by adding layers to the PCB.

The permanent magnets can be arranged with a special arrangement as a Halbach array so that the generated magnetic field is stronger on one side (e.g., an active side) of the Halbach array than the other, opposite side (e.g., an inactive side). The stronger side of the magnetic field can be arranged to face to the electrical windings on the PCB. The arrays of permanent magnets can produce magnetic flux densities that vary sinusoidally along the circumference of the cam ring. The magnetic field components oriented along the axial direction can provide a constant torque along the circumferential direction when the electrical windings come into and out along the axial direction and currents vary sinusoidally along the circumferential direction. The torque can drive the permanent magnets and the cam ring to rotate. The pattern of the electrical windings can be arranged according to sinusoidal magnetic flux densities of the permanent magnets. The cam ring can be made out of non-ferromagnetic material such as plastic.

Different motor architectures can be implemented. For example, a first motor architecture can include a single permanent magnet array (e.g., a Halbach array) and a multilayer PCB, which can minimize a total axial width and utilize less magnets. A second motor architecture can include two permanent magnet arrays (e.g., two Halbach arrays) with the multilayer PCB therebetween. As the multilayer PCB is centered between the two permanent magnet arrays, magnetic field components can be symmetric along the axial direction about the center of the multilayer PCB, which allows each phase winding have an exact same rotor-dependent torque constant so as to produce a constant torque output with a suitable drive scheme. Moreover, as the total magnetic flux density in the PCB is larger than that in the first motor architecture, a torque constant of the motor in the second motor architecture can be greater.

The technologies implemented in the present disclosure can use coreless Halbach arrays, which can avoid the use of low-reluctance (e.g., iron) components to complete the permanent magnet flux path and avoid losses due to eddy currents. Axial design can also allow the windings to be implemented on the multilayer PCB, which is easy for manufacturing. Moreover, the 2D layered motor design can achieve compact motor and associated actuation system.

The technologies can get rid of brushes, axial cam pins, linkage, and micro-motors in existing mechanical actuation systems. For example, the technologies can cut out a worm gear linkage and brush and bypass associated mechanical power inefficiencies or failure. An actuation system with less mechanical parts can also have a longer lifetime. Moreover, the technologies can allow the motor to operate at a low speed, which can generate little or no acoustic noise to thereby solve the severe acoustic noise problem.

Coreless annular axial flux motor based devices or systems implemented in the present disclosure can be widely used in various applications, including compact actuation systems, portable electronic and communication devices, such as wearable devices (e.g., eyeglasses), virtual reality (VR)/augmented reality (AR) displays, or any other applications that need axial motors.

Exemplary System and Optical Elements

FIG. 1 is a schematic diagram of an example augmented reality system 100 featuring a head-worn viewing component 102, a hand-held controller component 104, and an optional interconnected auxiliary computing or controller component 106 which may be configured to be worn as a belt pack or the like on a user. Each of the components 102, 104, 106 may be operatively coupled via connections 110, 112, 114, 116, 117, 118 to communicate with each other and to other connected resources 108, such as cloud computing or cloud storage resources, via wired or wireless communication configurations, such as those specified by IEEE 802.11, Bluetooth®, and other connectivity standards and configurations. In various embodiments, the depicted optical elements 120 may operate to enable the user wearing the viewing component 102 to view the world around the user along with visual components which may be produced by the associated system components, for an augmented reality experience. Such systems and experiences have been described in U.S. patent application Ser. Nos. 14/555,585, 14/690,401, 14/331,218, 15/481,255, and 62/518,539, each of which is incorporated by reference in its entirety.

Variable focus components may be utilized as components of the optical elements 120 to provide any suitable number of focal planes. In some embodiments, the optical elements 120 can include one or more assemblies of variable focus components (or variable focus assemblies) to provide a spectrum of focal planes that are selectable or tunable by an integrated control system. For example, pairs of variable focus assemblies, such as an inner lens assembly (ILA) and an outer lens assembly (OLA), can be used in the optical elements 120 to impart one of a range of focal depths to a virtual content using the ILA while correcting or compensating for distorted environmental light using the OLA.

Figure 2:
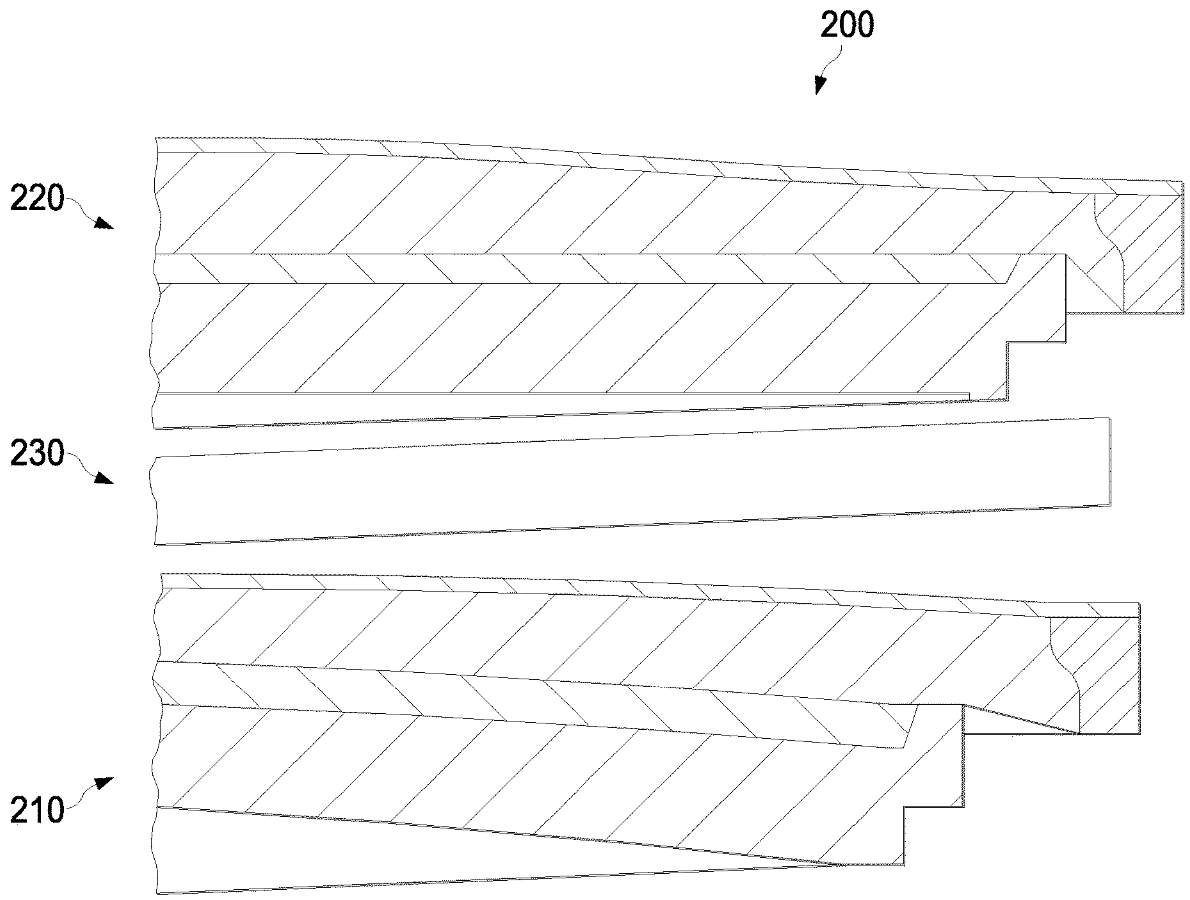
FIG. 2 is a partial cross sectional view of an optical element including a pair of variable focus assemblies.

FIG. 2 is a partial cross sectional view of an optical element 200 including a pair of variable focus assemblies with an augmented reality (AR) eyepiece in between. The optical element 200 can be one of the optical elements 120 of FIG. 1. The optical element 200 includes an eyepiece 230 and ILA 210 and OLA 220 that are respectively disposed on either side of the eyepiece 230. Virtual images from the eyepiece 230 can be projected toward and be shaped by ILA 210. Light from the surrounding environment can be shaped a first time by OLA 220 and then be shaped a second time by ILA 210, such that the net change in focus of the environmental light can be zero after the two shaping events. In some embodiments, a diameter of the OLA 220 is larger than that of the ILA 210.

Figure 3A:
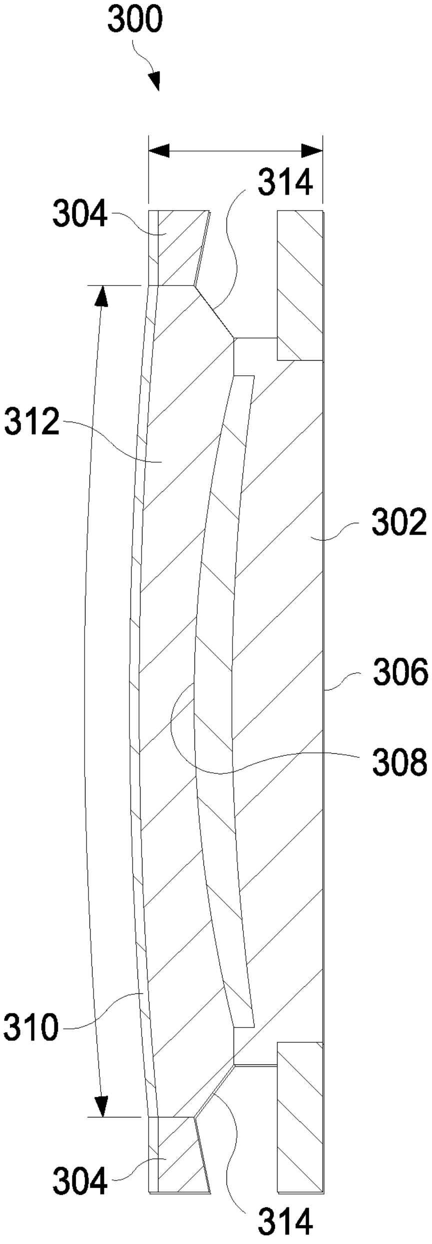
FIGS. 3A and 3B show an example of a liquid lens assembly in a variable focus assembly.
Figure 3B:
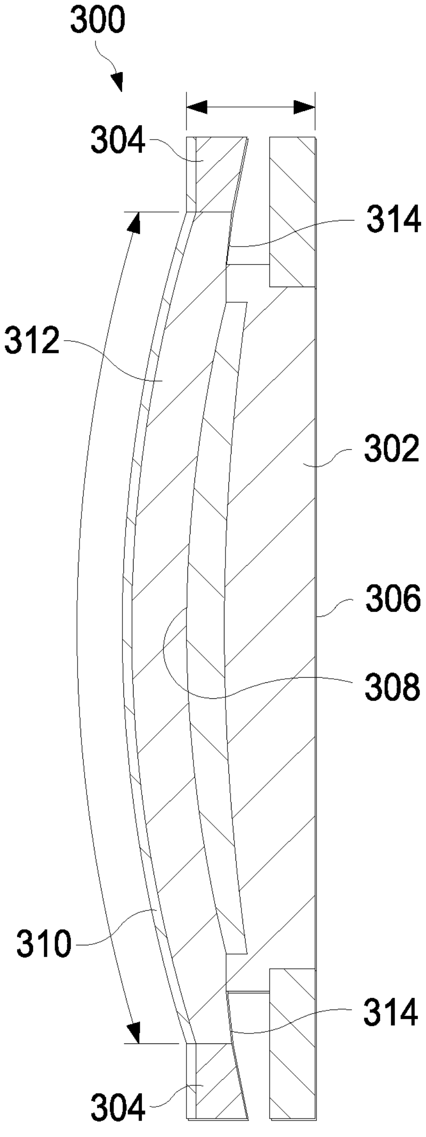
Figure 4:
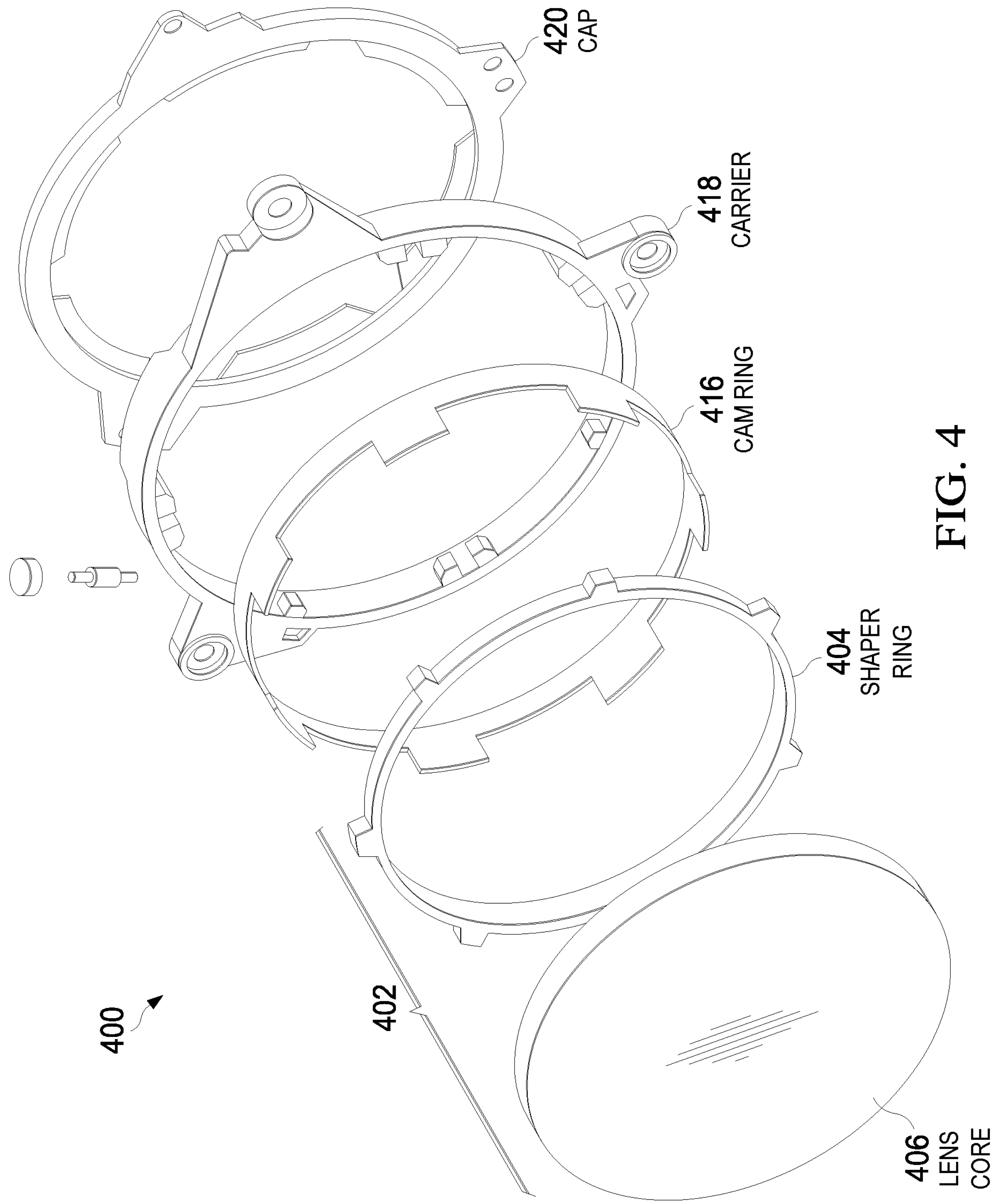
FIG. 4 is an exploded view of an example of a variable focus assembly.

In some embodiments, as discussed with further details in FIGS. 3A-3B and FIG. 4, each of the ILA 210 and the OLA 220 can include a cam ring and a shaper ring axially interior to the cam ring. The shaper ring can be actuated using an actuation system to move along an axial direction with a finite travel range. The actuation system can be the rotational actuation system 600 of FIG. 6A, which includes a rotational actuator and a radial force latch. The rotational actuator can be implemented by the motor 700 of FIG. 7, 800 of FIG. 8, or 1300 of FIG. 13A. The rotational actuator can rotate the cam ring with a limited rotational motion that can cause the shaper ring (or a load) to move with an axial motion.

In a particular implementation, ILA 210 can include one or more of the following specifications: travel range is about 721 μm, where the travel range can be a combination of alignment offset and actual motion requirements of the system; a maximum load spring force is about 2.24±0.3N and a minimum load spring force is about 0.70±0.3N; a mass of the shaper ring is about 0.62 grams; load stiffness is about 2.75 N/mm; lens damping is about ~1.0; a system natural frequency is about 100 Hz; a decenter of refractive to the shaper ring (datum) is about ±0.05 mm; a focal power error (combined ILA and OLA) is less than 0.1 Diopter; a focal power error (for a virtual system) is less than 0.1 Diopter; a flatness of the shaper ring attached to a membrane is less than 10 μm; and a tilt/tip of the shaper ring attached to membrane is less than 3 arc minutes.

In a particular implementations, OLA 220 can include one or more of the following specifications: travel range is about 760 μm, where the travel range can be the combination of alignment offset and the actual motion requirements of the system; a maximum load spring force is about 3.21±0.3N, and a minimum load spring force is about 1.35±0.3N; a shaper ring mass is about 0.72 grams; load stiffness is about 3.31 N/mm; lens damping is about ~1.0; a system natural frequency is about 100 Hz; a decenter of refractive to the shaper ring (datum) is about ±0.05 mm; a focal power error (combined ILA and OLA) is less than 0.1 Diopter; a focal power error (for a virtual system) is less than 0.1 Diopter; a flatness of the shaper ring attached to membrane is less than 10 μm; and a tilt/tip of the shaper ring attached to membrane is less than 3 arc minutes.

Exemplary Variable Focus Assembly

FIGS. 3A and 3B show an example of a liquid lens assembly 300 that can be used in a variable focus assembly, e.g., the ILA 210 or the OLA 220 of FIG. 2 or a variable focus assembly in the optical elements 120 of FIG. 1. The variable focus assembly is operable to adjust a curved shape of a fluid volume within the liquid lens assembly 300. Light traveling through a fluid encapsulated in a volume has a wavefront that can be altered when the light encounters a curved surface of the encapsulated fluid. A change in a wavefront of the light corresponds to a change in a focus of the light.

In some embodiments, the liquid lens assembly 300 includes a refractive component 302 and a shaper ring 304. The refractive component 302 can be a rigid, optically transparent material (such as plastic or glass) and can have flat surfaces, curved surfaces, or one flat and one curved surface (such as surfaces 306, 308, respectively). The shaper ring 304 can be made of a rigid material such as metal (aluminum, steel, or titanium), plastic, or other suitably light weight and rigid materials. A flexible lens membrane 310 can span the shaper ring 304 such that the flexible lens membrane 310 is attached along an entire circumference of the shaper ring 304 to create a seal. A constant volume of substantially incompressible fluid 312 can be encapsulated between the flexible lens membrane 310, the shaper ring 304, the refractive component 302, and an annular membrane 314. The annular membrane 314 is flexible to allow an axial motion of the shaper ring 304 (along an axis of the shaper ring 304) relative to the refractive component 302 while keeping the fluid sealed within the liquid lens assembly 300.

FIG. 3A shows that the shaper ring 304 and the refractive component 302 have a larger distance, while FIG. 3B shows that the shaper ring 304 is moved to have a smaller distance with the refractive component 302. When the shaper ring 304 is axially moved towards the refractive component 302 to cause the smaller distance, a surface of the flexible lens membrane 310 is more curved in FIG. 3B than in FIG. 3A, with the incompressible fluid 312 being pushed towards the flexible lens membrane 310.

FIG. 4 shows an exploded view of a variable focus assembly 400, e.g., the ILA 210 or the OLA 220 of FIG. 2 or a variable focus assembly in the optical elements 120 of FIG. 1. The variable focus assembly 400 includes a liquid lens assembly 402, e.g., the liquid lens assembly 300 of FIGS. 3A-3B. The liquid lens assembly 402 includes a shaper ring 404, a lens core 406, and other portions of a liquid lens assembly (not individually shown). In some embodiments, the liquid lens assembly 402, including the shaper ring 404, nests within a cam ring 416. Mechanical features on the shaper ring 404 can engage mechanical features of the cam ring 416 so that a rotational motion of the cam ring 416 results in an axial motion of the shaper ring 404, and thus, a change in a shape of a flexible lens membrane, e.g., the flexible lens membrane 310 of FIGS. 3A-3B, in the liquid lens assembly 402.

The cam ring 416 and the liquid lens assembly 402 can nest within a carrier frame 418. The cam ring 416 can be rotatable with respect to both the carrier frame 418 and the shaper ring 404. The shaper ring 404 can be axially movable with respect to both the cam ring 416 and the carrier frame 418. A cap 420 may be fixed to the carrier frame 418 to secure the positions of components, such as the cam ring 416, that are housed within or mounted to the carrier frame 418. In some embodiments, actuation systems for adjusting the curvature of the flexible lens membrane use relative rotational motions between the cam ring 416 and both the carrier frame 418 and the shaper ring 404 to impart an axial motion to the shaper ring 404, and thus, the flexible lens membrane. During the actuation, the carrier frame 418 can be static without movement, the cam ring 416 can have the rotational motion, and the shaper ring 404 can have the axial motion.

Figure 5A:
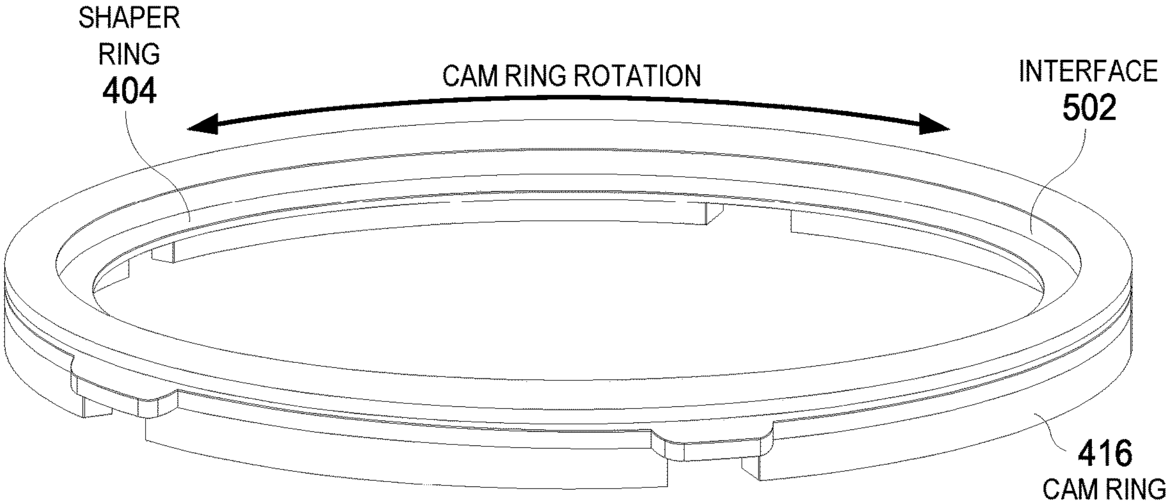
FIGS. 5A and 5B are schematic diagrams showing an example of mechanical features for engaging a shaper ring and a cam ring in a variable focus assembly.
Figure 5B:
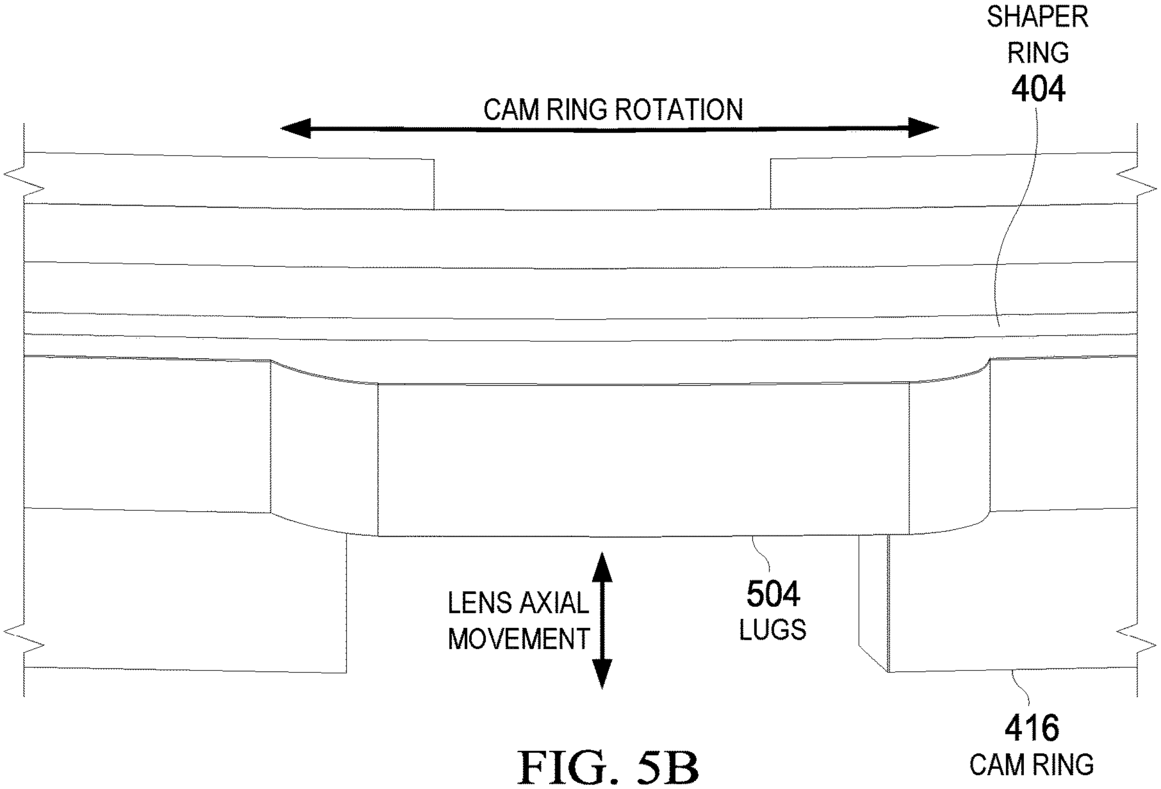

FIGS. 5A and 5B show an example of mechanical features for engaging the shaper ring 404 and the cam ring 416. As illustrated in FIG. 5A, a particular surface geometry is shown at an interface 502 between the shaper ring 404 and the cam ring 416. Lugs 504 are shown on the shaper ring 404 extending in an axial direction and engaging a helical spline feature on the cam ring 416 to impart axial motion to the shaper ring 404 as the cam ring 416 rotates. Other geometries such as ramps, steps, guide pins, and other mechanical features can be used to guide axial motion of the shaper ring 404 relative to the cam ring 416, particularly suitable geometries acting to convert relative rotation of the cam ring 416 with respect to the shaper ring 404 into axial movement of the shaper ring 404 with respect to the cam ring 416.

Exemplary Rotational Actuation System

Figure 6A:
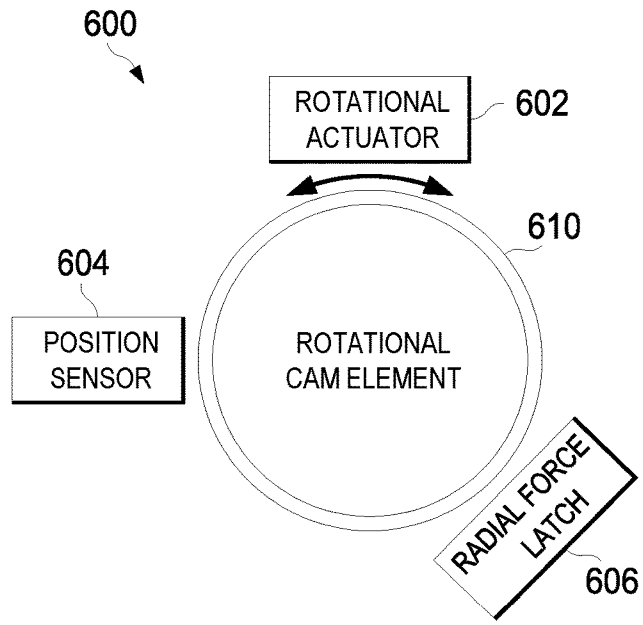
FIG. 6A is a schematic diagram of an example of an annular axial flux motor actuation system.

FIG. 6A shows an example of an annular axial flux motor based actuation system 600. The system 600 includes a rotational actuator 602 configured to actuate a rotational cam element 610. The cam element 610 can be the cam ring 416 of FIG. 4. In some cases, the cam element 610 can be an annular subsection of a cam ring, e.g., a half of the cam ring. The cam element 610 can have a finite (or limited) actuation range, e.g., ±4 degrees. As described with further details in FIGS. 7, 8, and 13A, the finite actuation range can be achieved by realizing the rotational actuator 602 corresponding to an annular subsection of the cam element 610.

The system 600 can include a position sensor 604 configured to detect a position of the cam element 610. For example, the position sensor 604 can be calibrated to zero when the cam element is at an original position. When the rotational actuator actuates the cam element 610 to rotate, the position sensor 604 can detect how many degrees the cam element 610 has been rotated and then determine the current position of the cam element 610 based on a result of the detection.

In some implementations, the cam element 610 has enough friction to be self-locking when there is no actuation from the rotational actuator 602. In some implementations, the system 600 includes a radial force latch 606 configured to prevent the cam element 610 from moving. The rotational actuator actuates the cam element 610 when the radial force latch 606 is released.

Figure 6B:
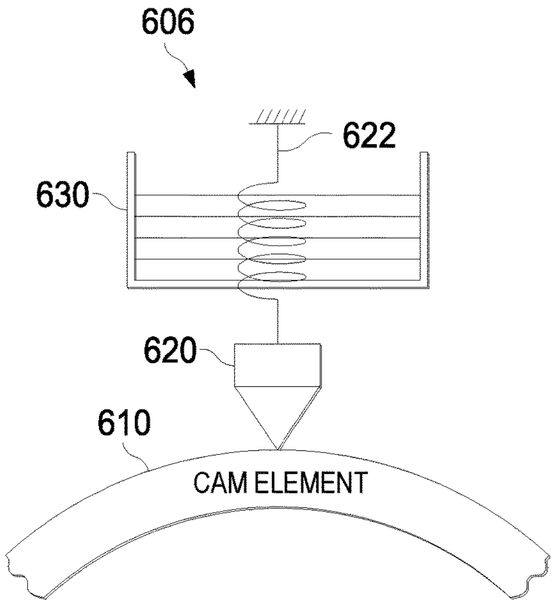
FIGS. 6B and 6C illustrate an operation of the actuation system of FIG. 6A in an operation state (FIG. 6B) and a release state (FIG. 6C).
Figure 6C:
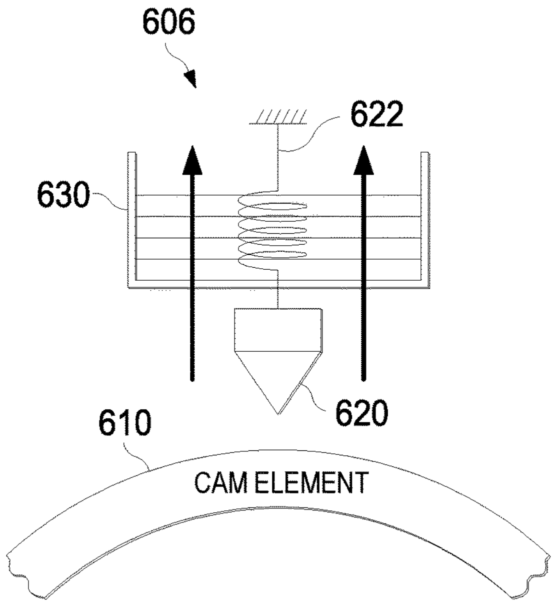

FIGS. 6B and 6C show an example of the radial force latch 606 in an operation state (FIG. 6B) and a release state (FIG. 6C). The radial force latch 606 can include a drive dog 620 that is loaded with a spring 622 and radially into the cam element 610. The drive dog 620 can be made of ferromagnetic metal and can be released via a radially oriented solenoid 630. Solenoid power is consumed only during actuation. At the operation state, as illustrated in FIG. 6B, solenoid electromagnet is un-powered. The spring 622 pushes the drive dog 620 towards the cam element 610 to prevent the cam element 610 from moving. At the release state, as illustrated in FIG. 6C, solenoid electromagnet is energized and the drive dog 620 is retracted towards the spring 622 (as arrows show) and the cam element 610 is free to move.

In some implementations, a circuit for actuation of the solenoid 630 can include a low side drive switch for unidirectional actuation. A snubber can be added parallel to a load if slow actuation of the solenoid 630 is needed. If the current driving the solenoid 630 needs to be ramped, an open loop current control can be implemented by replacing a metal-oxide-semiconductor field-effect transistor (MOSFET) with a Bipolar Junction Transistor (BJT) or BJT Darlington and using a digital-to-analog circuit (DAC) of a microcontroller unit (MCU) to ramp the BJT's base current.

In a particular implementation, the actuator 602 can have one or more of the following specifications: mass is less than 7.9 grams; thrust and start thrust are from ±1 N to ±4 N; speed is about 50 mm/second; stroke is in a range of 0.8 to 3.5 mm; dynamics of a moving system (transfer function: stiffness (k), mass damping (m), natural frequency (fn) and damping ratio (β)): meff is less than 5 grams, k is larger than a value in a range of 2.0 N/mm-4 N/mm or 4.0 N/mm-8 N/mm, fn is between 30-200 Hertz, and β is between 0.5-3.0; positioning accuracy (allowable motor error motions for six degrees of freedom) is ±0.2 mm; minimum possible motion step is less than 1 μm; orientation (tip/tilt) uncertainty is less than 120 arc minutes; distributed load characteristics is about Φ 40 mm; a duty Cycle is about 12 million switches at a frequency of 0.3 Hz; form factor of motor: dimensions <33 mm×16 mm×9.2 mm; form factor for actuated elements: Φ 40 mm with distributed load; allowable deformation of mechanical components and mounting locations is less than 0.020-0.300 mm; self-locking holding force is larger than 1.2× actuation force; power consumption: average is less than 0.5 Watts, maximum is less than 1.0 Watts; driving sound (allowable noise) is less than 25-32 dbA at 25 mm; heating value is less than 1 Watt; temperature during drive is less than 60° C.; lifetime is about 10,000 hours; usage environment (usage temperature, usage humidity): ambient temperature is in a range of −10° C. to +55° C., non-condensing humidity is in a range of 5-95%; and shock resistance can be a survive drop of 1 meter in 3 orientations with no damage.

Exemplary Annular Axial Flux Motors

Figure 7:
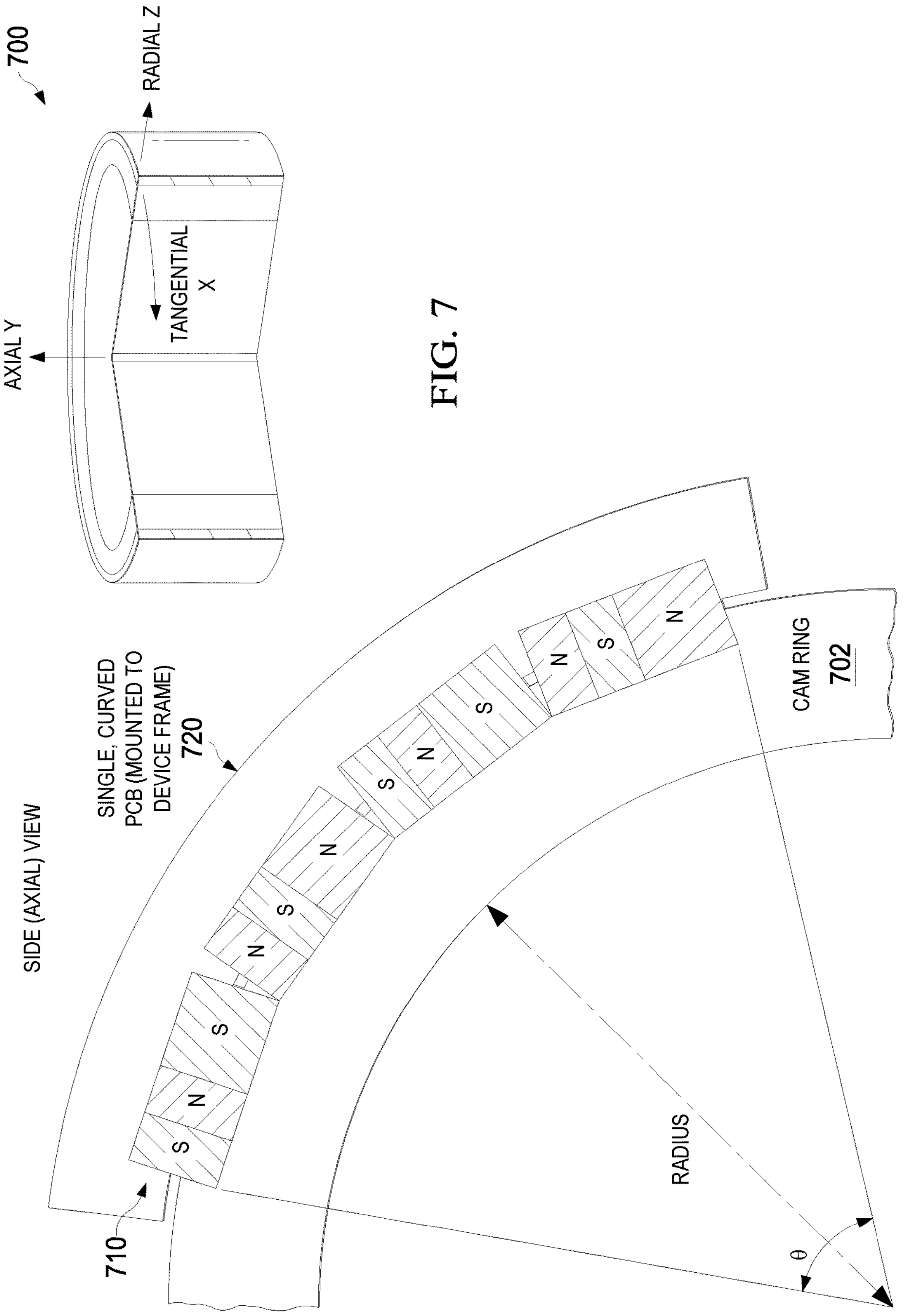
FIG. 7 is a schematic diagram of an example of an actuator including an annular axial flux motor.

FIG. 7 shows an example of an annular flux permanent magnet axial motor 700. The motor 700 can be implemented as an actuator, e.g., the actuator 602 of FIGS. 6A-6C, in a variable focus assembly, e.g., the ILA 210 or the OLA 220 of FIG. 2, the variable focus assembly 400 of FIG. 4, or in a liquid lens assembly, e.g., the liquid lens assembly 300 of FIG. 3A-3B or the liquid lens assembly 402 of FIG. 4.

The motor 700 is configured to move the variable focus assembly, e.g., by moving a cam ring 702 of a liquid lens assembly in the variable focus assembly. The cam ring 702 can be the cam ring 416 of FIG. 4. The variable focus assembly can include a shaper ring, e.g., the shaper ring 404 of FIG. 4 or the shaper ring 304 of FIGS. 3A-3B, nesting within the cam ring 702. A rotational motion of the cam ring 702 can result in an axial motion of the shaper ring. The cam ring 702 can nest within a carrier frame (not shown), e.g., the carrier frame 418 of FIG. 4. The cam ring 702 can be rotatable with respect to the carrier frame. The shaper ring is axially movable with respect to both the cam ring 702 and the carrier frame. An axial motion of the shaper ring can cause a change of a curvature of a flexible lens membrane coupled to the shaper ring.

The motor 700 can cause the cam ring 702 to rotate with a finite (or limited) travel range, e.g., within a limited angle range, but not to rotate continuously in a full circle. The cam ring 702 can be rotated forward and/or backward within the finite travel range.

In some embodiments, the motor 700 includes a rotor 710 formed by placing an array (or arrays) of permanent magnets with a particular arrangement around at least a portion of an annular opening of the cam ring 702. As illustrated in FIG. 7, the array of permanent magnets can be arranged on an annular subsection, e.g., an arc within an angle of Θ, of the cam ring 702. The permanent magnets are arranged along a circumference of the cam ring 702. The array of permanent magnets can include alternating pairs of opposite magnet poles (N and S). The cam ring 702 can be made out of non-ferromagnetic material such as plastic.

The motor 700 further includes a stator 720 formed by placing electrical windings around at least a portion of an annular opening of the carrier frame so that the permanent magnets and electrical windings are mounted to separate components and correspond to each other. The electrical windings can be made using a conductive material, e.g., copper, printed on a printed circuit board (PCB). The PCB can then be cut to size or curved and mounted to the carrier frame. In some embodiments, multiple layers of printed electrical windings can be stacked on top of each other on the PCB, so that the density of the windings can be increased. Higher density of windings can provide higher torque output. The stator 720 can be implemented in either 2-phase, 3-phase or even more phase windings.

As an electrical current passes through the PCB windings, a time-varying magnetic field is created that interacts with the array of permanent magnets of the rotor 710 to cause relative rotation between the rotor 710 with the cam ring 702 and the carrier frame. Axes of the coordination x, y, z represent a tangential direction, an axial direction, and a radial direction, respectively. The array of permanent magnets and the electrical windings can be configured such that the varying magnetic field of the PCB windings interacts with an axial component along the axial direction (i.e., y direction) of the magnetic field of the rotor 710 to provide a constant torque to generate a force along the tangential direction (i.e., x direction) to thereby rotate the permanent magnets of the rotor 710 and the cam ring 702.

In some other embodiments, the array of permanent magnets of the rotor 710 can be formed on the carrier frame, while the electrical windings on the PCB of the stator 720 can be formed on the cam ring 702, such that the electrical windings and the array of permanent magnets can be formed on separate components and can have a relative movement.

Figure 8:
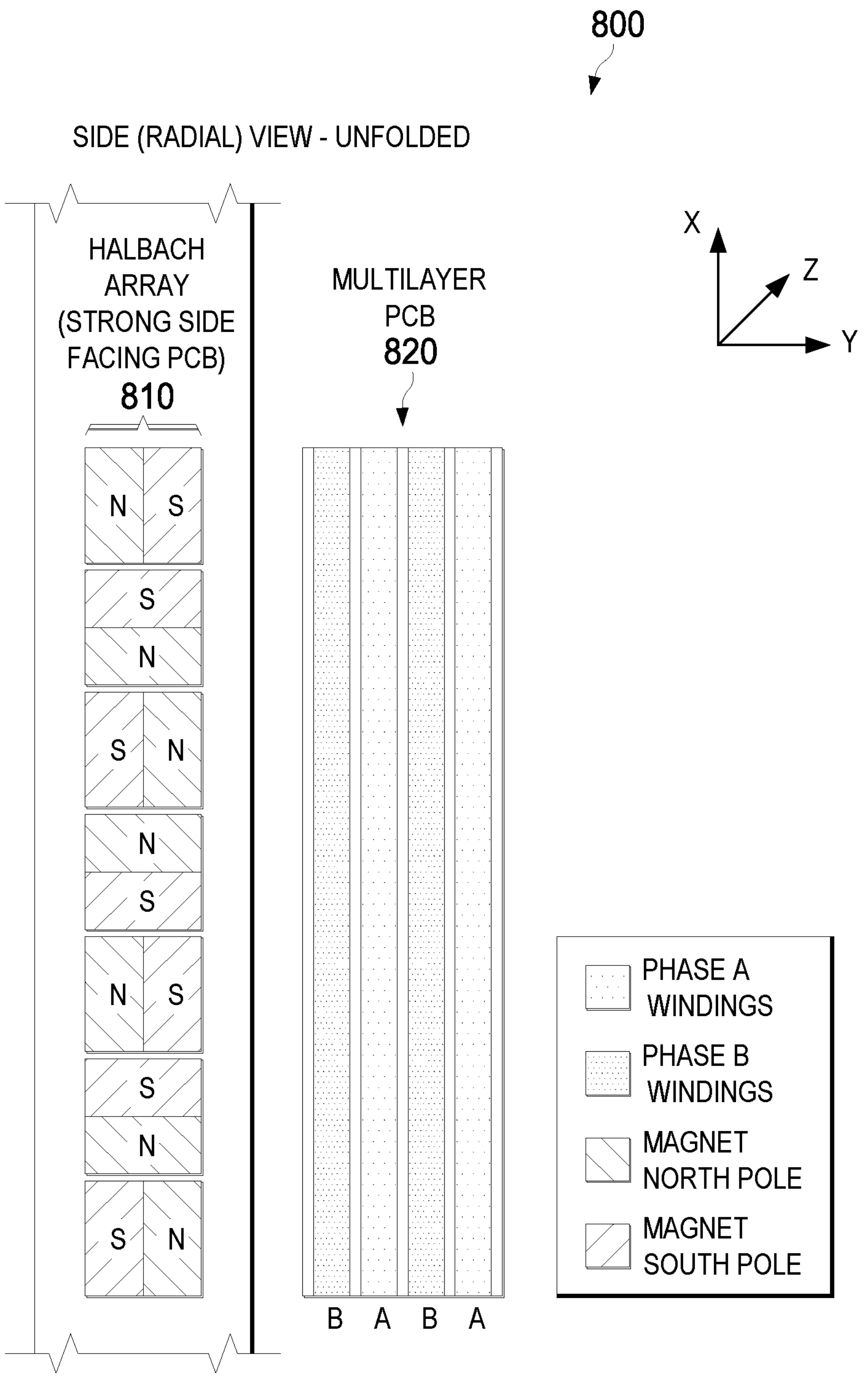
FIG. 8 is a schematic diagram of an example of an annular axial flux motor including a Halbach array and a multilayer PCB.

FIG. 8 shows an example of an annular flux permanent magnet axial motor 800. The motor 800 can be the motor 700 of FIG. 7. The motor 800 includes a rotor 810, e.g., the rotor 710 of FIG. 7, and a stator 820, the stator 720 of FIG. 7. The rotor 810 can include an array of permanent magnets mounted on a rotatable cam ring, e.g., the cam ring 702 of FIG. 7. The stator 820 can be mounted on a carrier frame, e.g., the carrier frame 418 of FIG. 4, that carries the rotatable cam ring. FIG. 8 shows an unfolded side (radial) view of the motor 800.

In some implementations, the rotor 810 includes a Halbach array having a special arrangement of permanent magnets that augments the magnetic field on one side (e.g., active side) of the array while cancelling the magnetic field to near zero on the other, opposite side (e.g., inactive side). The Halbach array has a spatially rotating pattern of magnetization. The rotating pattern of permanent magnets (on the front face; on the left, up, right, down) can be continued indefinitely and have the same effect. The effect of the arrangement can be similar to a number of horseshoe magnets placed adjacent to each other, with similar poles touching.

Figure 9:
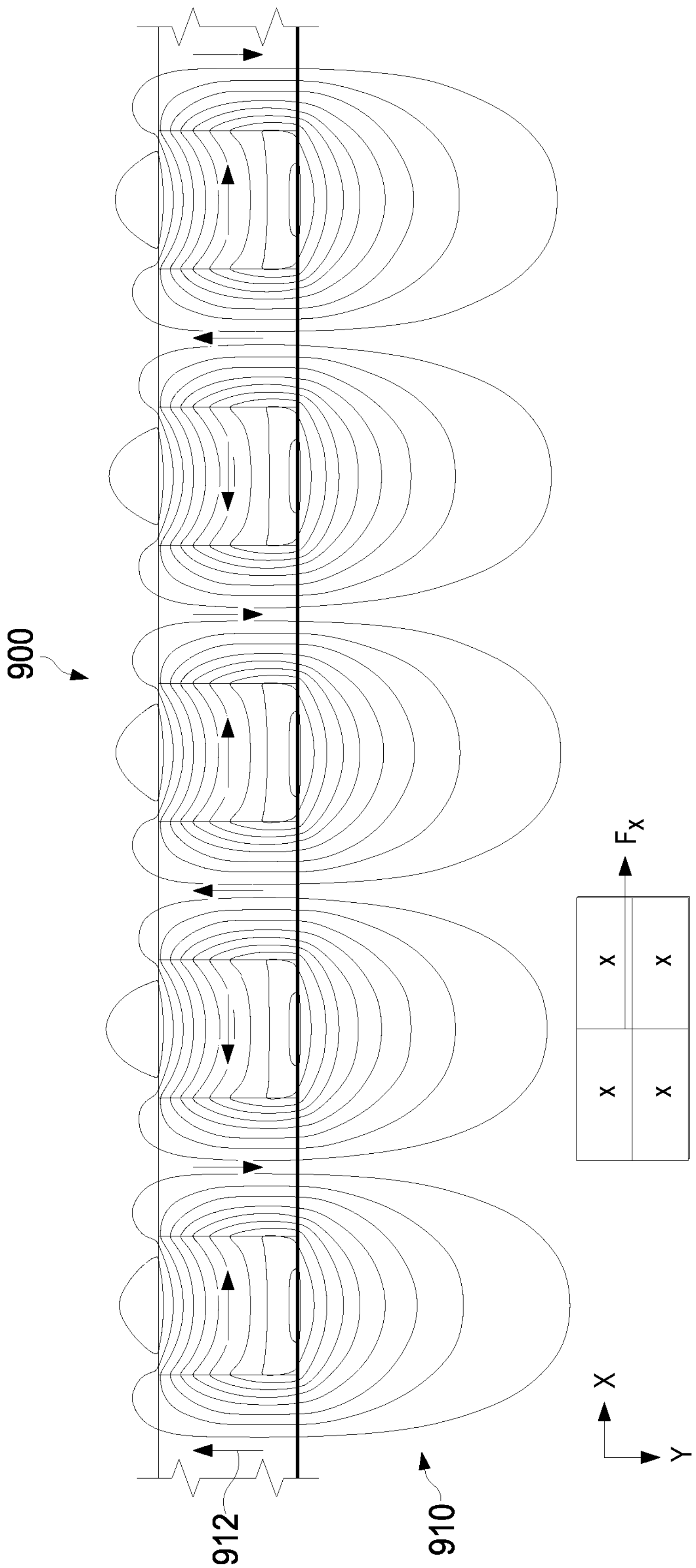
FIG. 9 illustrates an example of a magnetic field of a Halbach array.

FIG. 9 shows an example of a magnetic field 910 of a Halbach array 900. The Halbach array 900 includes a linear array of permanent magnets extending along a horizontal direction, i.e., x direction. The magnetic field 910 has a horizontal direction component, e.g., x direction, and a vertical direction component (or an axial direction), e.g., y direction. Arrows 912 show the field directions in each magnet pole of the Halbach array 900. Due to the special arrangement of the Halbach array 900, the magnetic field 910 is stronger on one side of the Halbach array 900 (as shown a bottom side of the Halbach array 900) than the other, opposite side of the Halbach array 900 (as shown a top side of the Halbach array 900).

The magnetic field 910 of the Halbach array 900 on the stronger side (or active side) can be expressed as below:

$$B(x,y)=B_x+jB_y=B_0e^{jkx}e^{-ky}=B_0\cos(kx)e^{-ky}+jB_0\sin(kx)e^{-ky}, \quad (1)$$

where $B_0$ represents a magnetic field magnitude, $B_x$ represents a magnetic field vector along x direction, $B_y$ represents a magnetic field vector along y direction, and k represents a wave vector.

When a current flows through electrical windings, a time-varying magnetic field can be generated and interacts with the magnetic field 910 of the Halbach array 900 to generate a Lorentz force F. The Lorentz force F can be expressed as below:

$$F=(N*i)L\times B, \quad (2)$$

where N represents a turn count of the electrical windings, i represents a current magnitude through the electrical windings, L represents a winding length vector, and B represents a magnetic field vector from the Halbach array 900.

As discussed before, to rotate a rotor arranged on the cam ring, a force along the tangential direction of the cam ring, i.e., x direction, needs to be utilized. If the electrical windings come into and out along the z direction, only the y component $B_y$ of the magnetic field of the Halbach array 900 contributes to the x component of the Lorentz force $F_x$, while the x component of the magnetic field $B_x$ creates y force which translates to an axial force $F_y$. Thus, the magnetic field component $B_y$ can be maximized to increase the tangential force $F_x$ while the magnetic field component $B_x$ can be minimized to reduce the axial force $F_y$.

Referring back to FIG. 8, the active side of the Halbach array of the rotor 810 is configured to face the multilayer PCB of the stator 820. In some embodiments, the Halbach array is a linear array extending along the tangential direction (x direction) or along the circumference of the cam ring. The Halbach array includes periodical units of permanent magnets. Each unit can include rows of magnet pole pairs N and S. As illustrated in FIG. 8, an example magnetic unit includes 4 rows of magnet pole pairs in an ordered sequence along the tangential direction: a vertical N pole and a vertical S pole on a first row along the axial direction, a horizontal S pole and a horizontal N pole on a second row along the axial direction, a vertical S pole and vertical N pole on a third row along the axial direction, and a horizontal N pole and a horizontal S pole on a fourth row along the axial direction. Other sequences that can form a stronger field on one side than the other side of the permanent magnet can also be implemented in the rotor 810. Adjacent rows can have a magnetic space that can be an air space or filled with a material having a lower stiffness than the permanent magnets.

Figure 10:
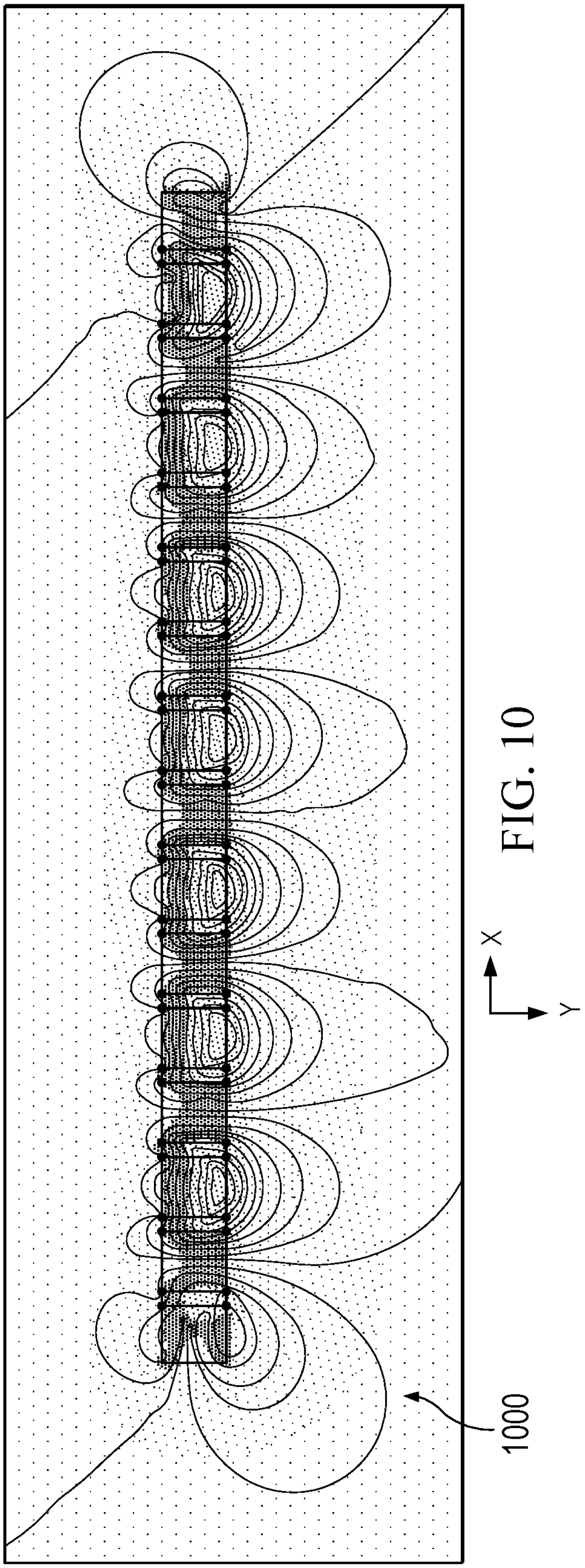
FIG. 10 illustrates a simulated magnetic field of the Halbach array of FIG. 8.

FIG. 10 shows a simulated magnetic field 1000 of the Halbach array of FIG. 8. The magnetic field of the Halbach array can be simulated by a software tool for performing finite element simulation of magnetic field, e.g., FEMM (Finite Element Method Magnetics). In the simulation, each magnetic pole is configured to have a width of 1 mm and a height of 1 mm, and a magnet spacing is 0.1 mm. The magnet grade is N42H. The simulated field 1000 shows that the Halbach array generates a stronger field on an active side of the array than the other inactive side of the array, similar to the magnetic field 910 illustrated in FIG. 9.

Figure 11A:
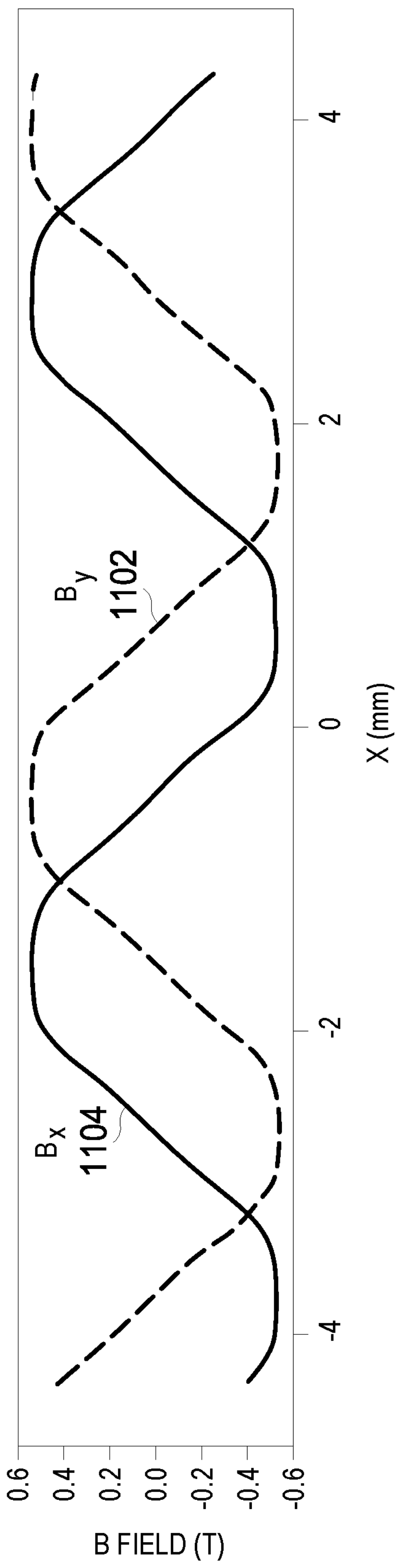
FIGS. 11A and 11B show the simulated magnetic field components of FIG. 10.
Figure 11B:
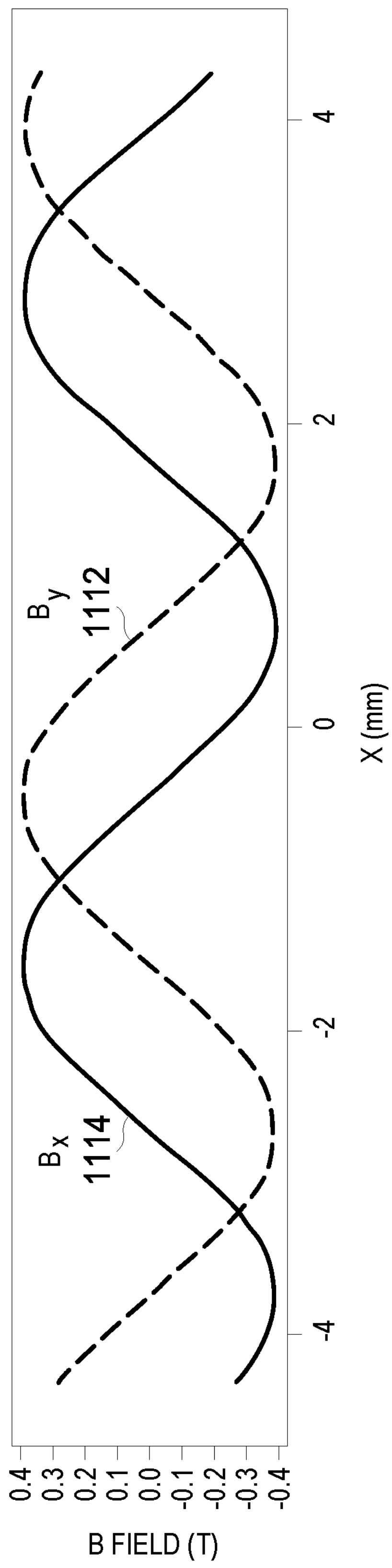

FIGS. 11A and 11B show components of the simulated magnetic field 1000 along the horizontal direction of the Halbach array, i.e., x direction. Curves 1102 and 1112 show the y component $B_y$ of the magnetic field, while curves 1104 and 1114 represent the x component $B_x$ of the magnetic field. FIG. 11A shows the magnetic field at a distance of 0.25 mm from the active side of the Halbach array, and FIG. 11B shows the magnetic field at a distance of 0.50 mm from the active side of the Halbach array. The curves show that the magnetic field components Bx and By are sinusoids that are 90 degree out of phase. The magnetic field B is stronger when it is closer to the Halbach array.

Referring back to FIG. 8, if the stator 820 has a single phase electric winding, the x component of the Lorentz force $F_x$ can be expressed as:

$$F_x=iL_z(x)B_y(x)\cos(kx+\pi/2)=iL_z(x)B_0(y)|\sin(kx)|, \quad (3)$$

where $L_z(x)$ represents a winding length of a square wave that varies with x. The winding direction changes every π electrical radians, which ensures that the product of $L_z$ and $B_y$ is positive, and polarity of $F_x$ is determined by polarity of current i. The expression (3) shows that the force $F_x$ is a non-constant and varies with x.

To generate a constant torque for the rotor 810, the stator 820 can be configured to have at least 2 phase electric windings. For example, for the stator 820 having 2 phase (phase A and phase B) electrical windings with sinusoidal drive currents that are π/2 rad out of phase, the force $F_x$ can be expressed as:

$$F_x = i_A(x)L_{z-A}(x)B_y(x) + i_B(x)L_{z-B}(x)B_y(x) = 2i|L_z|B_0(y)(\sin^2(kx) + (\sin^2(kx+\pi/2)) = B_0(y)2i|L_z|. \quad (4)$$

The above expression shows that $F_x$ is constant with x, when the currents $i_A$ and $i_B$ through the 2 phase electric windings vary sinusoidally with x, for example, by a field-oriented control (FOC).

The stator 820 can be also configured to have 3 phase electrical windings with sinusoidal drive currents that are 2π/3 rad (i.e., 120 degree) out of phase relative to one another, and the force $F_x$ can remain the same as that in the expression (4). For illustration purposes only, FIG. 8 shows that the stator 820 has 2-phase electric windings. The stator 820 can be a multilayer PCB with each layer representing each phase windings. The stator 820 can include a 2-phase winding where the phase difference of currents through the two phase windings is π/2. The stator 820 can include one or more pairs of phase A and phase B windings. For example, FIG. 8 shows that the stator 820 includes a 2-phase winding with 2 pairs of phase A and phase B windings.

Figure 12:
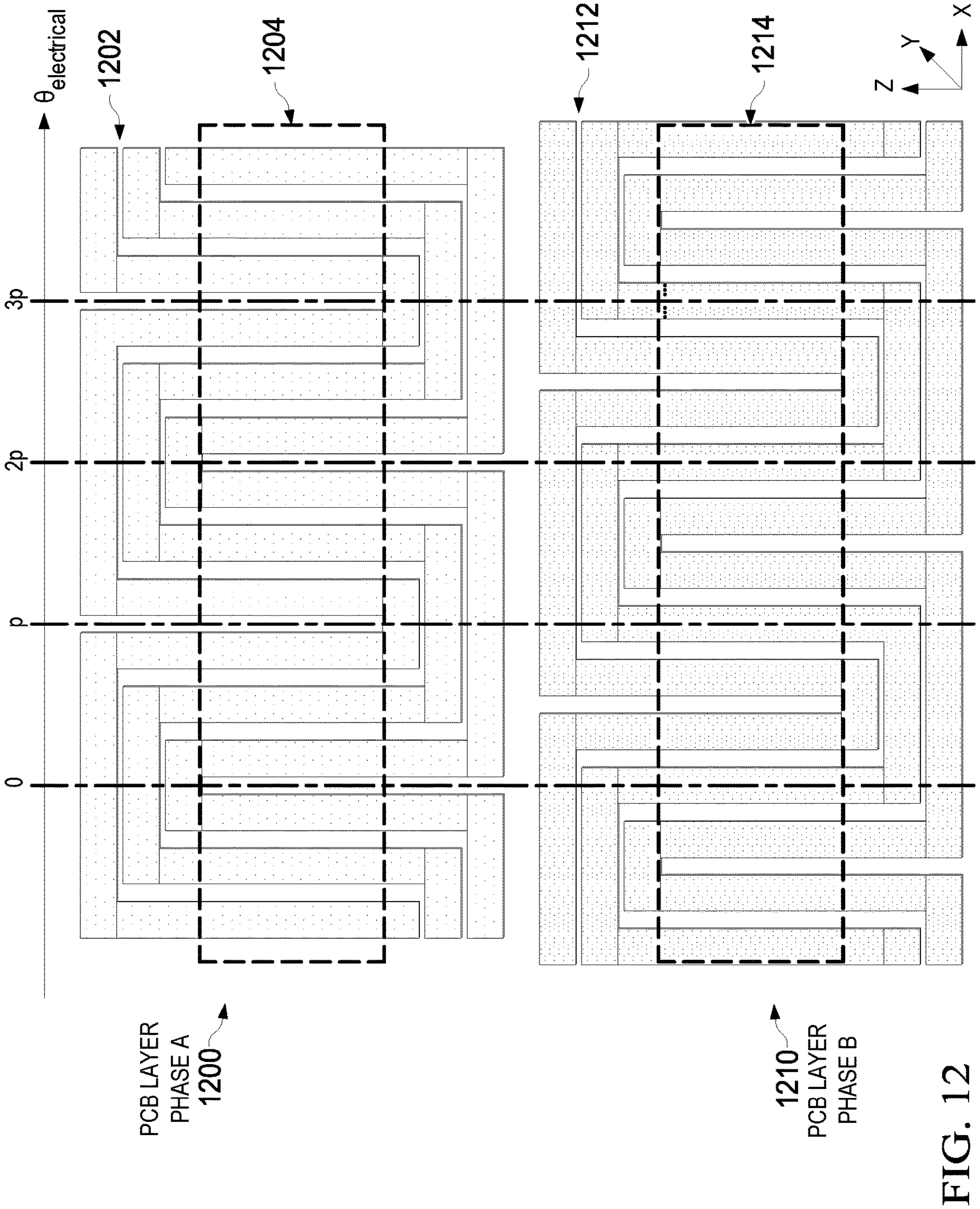
FIG. 12 is a schematic diagram of an example of 2-phase electrical windings with a rectangular pattern.

FIG. 12 shows an example of phase A and phase B electrical windings with a rectangular pattern. Rectangular windings 1200 represent phase A electrical windings on a first PCB layer, and rectangular windings 1210 represent phase B electrical windings on a second PCB layer. The phase A and phase B rectangular windings 1200 and 1210 are configured to be offset with a quarter of a winding period, corresponding to a π/2 phase difference. The rectangular windings 1200 have nominal gaps (e.g., air gaps) 1202 between windings on the first PCB layer, and the rectangular windings 1210 have nominal gaps (e.g., air gaps) 1212 between windings on the second PCB layer. The gaps 1202 and the gaps 1212 can have the same width or different widths.

The dashed boxes 1204 and 1214 represent regions contributing to useful current, while the heights of the dashed boxes along the radial direction (z direction) correspond to the height of the permanent magnet in a rotor along the radial direction (z direction), e.g., the rotor 810 of FIG. 8. A ratio of magnet height to an electrical winding period can be configured to be high such that heat generated due to winding coil resistance can be minimized. Nominal gaps 1202 and 1212 can be kept small to maximize a torque constant $K_T$. A ratio ($Ra/K_T^2$) of a total resistance (Ra) of the windings to a square of the torque constant ($K_T$) can be minimized to minimize energy losses due to the coil material (e.g., copper) and maximize an operation efficiency of a motor, e.g., the motor 800 of FIG. 8.

Figure 13A:
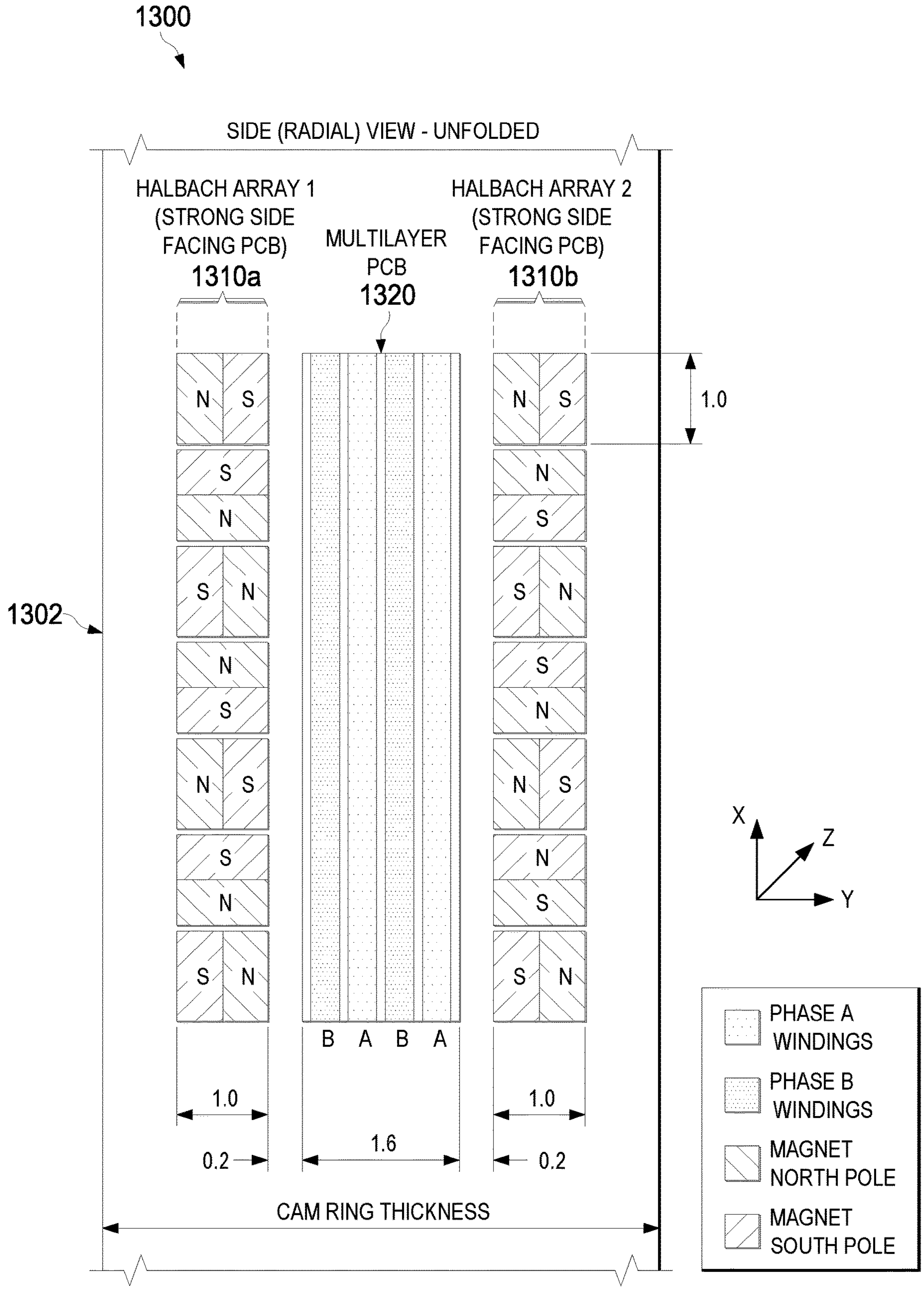
FIG. 13A is a schematic diagram of another example of an annular axial flux motor including a multilayer PCB between two Halbach arrays.

FIG. 13A shows another example of an annular flux permanent magnet axial motor 1300. The motor 1300 can be implemented as the actuator 602 of FIGS. 6A-6C. Compared to the motor 800 of FIG. 8, the motor 1300 includes two arrays of permanent magnets 1310*a* and 1310*b* as a rotor and a multilayer PCB of electrical windings 1320 as a stator that is between the two arrays of permanent magnets 1310*a* and 1310*b* along the axial direction, e.g., y direction. The multilayer PCB 1320 can be implemented as a 2-phase winding scheme and includes alternating pairs of phase B and phase A electrical winding layers. The number of layers are evenly divided into two sets of windings that are 90 degrees out of phase. Given a drive scheme that implements field-oriented-control, which implements drive currents that vary sinusoidally with a rotor position, a flat torque output can be achieved. The multilayer PCB 1320 can be also configured to be a 3-phase winding scheme, where the number of layers in the PCB is an integer multiple of 3 (or 6) and that the different windings are routed 120 degrees out of phase to each other.

As the multilayer PCB 1320 is centered between the two sets of permanent magnets 1310*a* and 1310*b*, magnetic field components of the magnetic fields of the two sets 1310*a* and 1310*b* can be symmetric along the axial direction (i.e., y direction) about the center of the PCB 1320, which allows each winding phase having an exact same rotor-dependent torque constant so as to produce a constant torque output with a suitable drive scheme. Moreover, a stronger and more uniform flux density can be achieved in the motor 1300. Accordingly, the torque constant of the motor 1300 can be increased.

In some embodiments, the first array of permanent magnets 1310*a* includes a Halbach array, e.g., the Halbach array of the rotor 810 of FIG. 8. The first array 1310*a* has a special arrangement of permanent magnets that augments the magnetic field on one side of the array while cancelling the field to near zero on the other side. The first array 1310*a* is arranged with the stronger side facing one side of the multilayer PCB 1320, e.g., a first layer of the multilayer PCB 1320. In some embodiments, the first array of 1310*a* is a linear Halbach array including periodical magnet units extending along the tangential direction. Each magnet unit can include four rows of magnet pole pairs with an ordered sequence along the tangential direction: a vertical N pole and a vertical S pole sequentially stacked along the axial direction on a first row, a horizontal S pole and a horizontal N pole sequentially stacked along the tangential direction on a second row, a vertical S pole and a vertical N pole sequentially stacked along the axial direction on a third row, and a horizontal N pole and a horizontal S pole sequentially stacked along the tangential direction on a fourth row. Adjacent rows have a magnetic space.

In some embodiments, the second array of permanent magnets 1310*b* can be also a Halbach array that has a special arrangement of permanent magnets augmenting the magnetic field on one side of the array while cancelling the field to near zero on the other side. The second array 1310*b* is configured to have the stronger side of the magnetic field facing the other side of the multilayer PCB 1320, e.g., a last layer of the multilayer PCB 1320. In some embodiments, the second array 1310*b* is a linear Halbach array that includes periodical magnet units extending along the tangential direction. Each magnet unit can include four rows of magnet pole pairs with an ordered sequence along the tangential direction: a vertical N pole and a vertical S pole sequentially stacked along the axial direction on a first row, a horizontal N pole and a horizontal S pole sequentially stacked along the tangential direction on a second row, a vertical S pole and vertical N pole sequentially stacked along the axial direction on a third row, a horizontal S pole and a horizontal N pole sequentially stacked along the tangential direction on a fourth row. Adjacent rows have a magnetic space.

As illustrated in FIG. 13A, the second array 1310*b* has a different arrangement than the first array 1310*a*, where the second row and the fourth row have opposite magnet poles, such that the stronger side of the second array 1310$b$ is on the left side of the Halbach array of the second array 1310$b$ and the stronger side of the first array 1310$a$ is on the right side of the Halbach array of the first array 1310$a$.

Figure 13B:
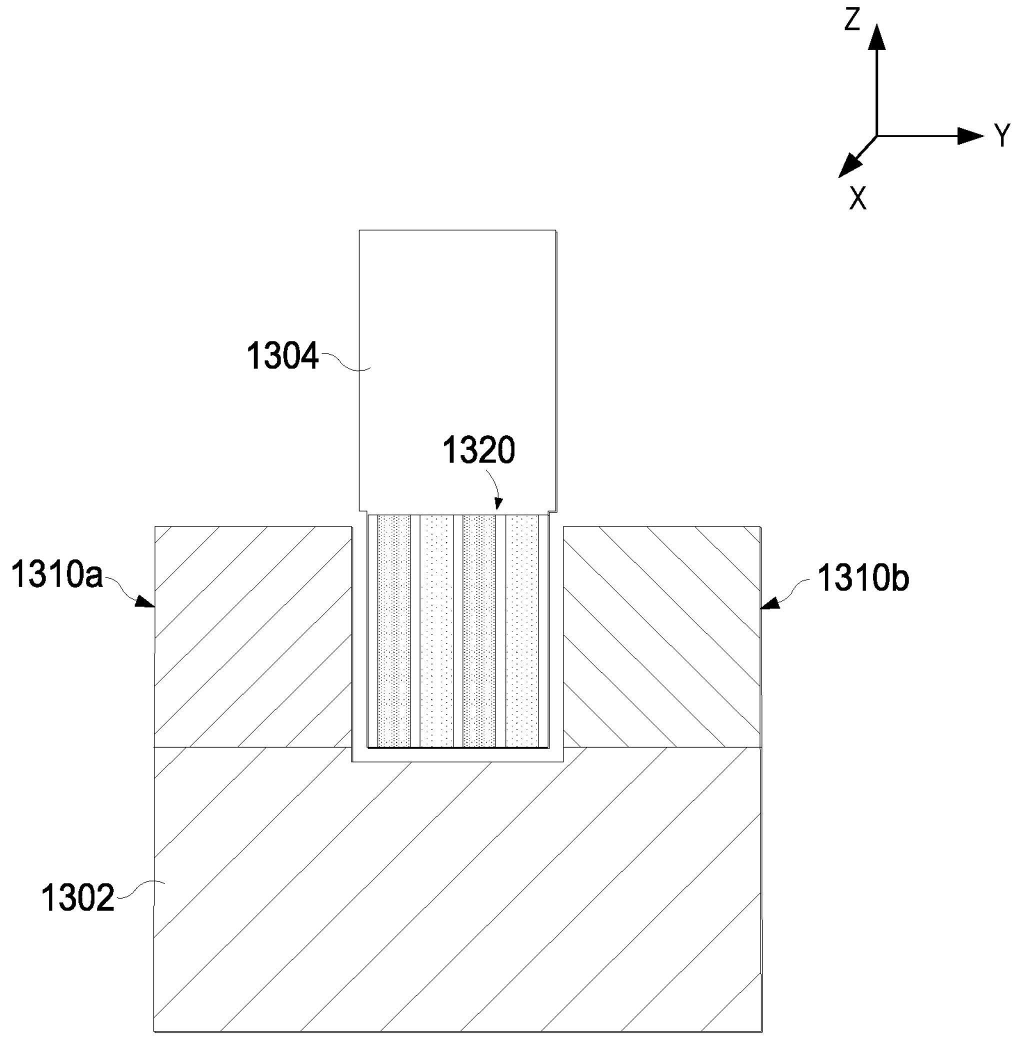
FIG. 13B is a schematic diagram of an example arrangement of the motor of FIG. 13A.

FIG. 13B shows a schematic diagram of an arrangement of the motor 1300 of FIG. 13A. The two arrays of permanent magnets 1310$a$ and 1310$b$ can be mounted on a cam ring 1302. The cam ring 1302 can include a recess with the two sets of permanent magnets 1310$a$ and 1310$b$ on both sides of the recess, and the multilayer PCB 1320 can be inserted into the recess and mounted on a carrier frame 1304 that is exterior to the cam ring 1302. In some embodiments, the cam ring 1302 has no recess and the two sets of permanent magnets 1310$a$ and 1310 mounted on a circumference of the cam ring 1302 can form a gap therebetween, and the multilayer PCB 1320 mounted on the carrier frame 1304 can be inserted into the gap. The multilayer PCB 1320 can have a height (along the radial direction) substantially same as the arrays of permanent magnets 1310$a$ and 1310$b$ along the radial direction.

In a particular embodiment, as illustrated in FIG. 13A, each magnetic pole N or S has a length of 1.0 mm along the x direction and a width of 0.5 mm along the y direction. Thus, each array of permanent magnets has a width of 1 mm along the y direction. The multilayer PCB 1320 has a total width of 1.6 mm along the y direction. The PCB 1320 can include 2 pairs of alternating phase A and phase B printed electrical winding layers. A nominal gap between the multilayer PCB 1320 and each array of permanent magnets 1310$a$, 1310$b$ is about 0.2 mm along the y direction. The thickness of the cam ring 1302 can be no less than 4 mm. The magnetic space between adjacent rows in the arrays of permanent magnets can be 0.25 mm. The magnet grade can be N42H.

Figure 14:
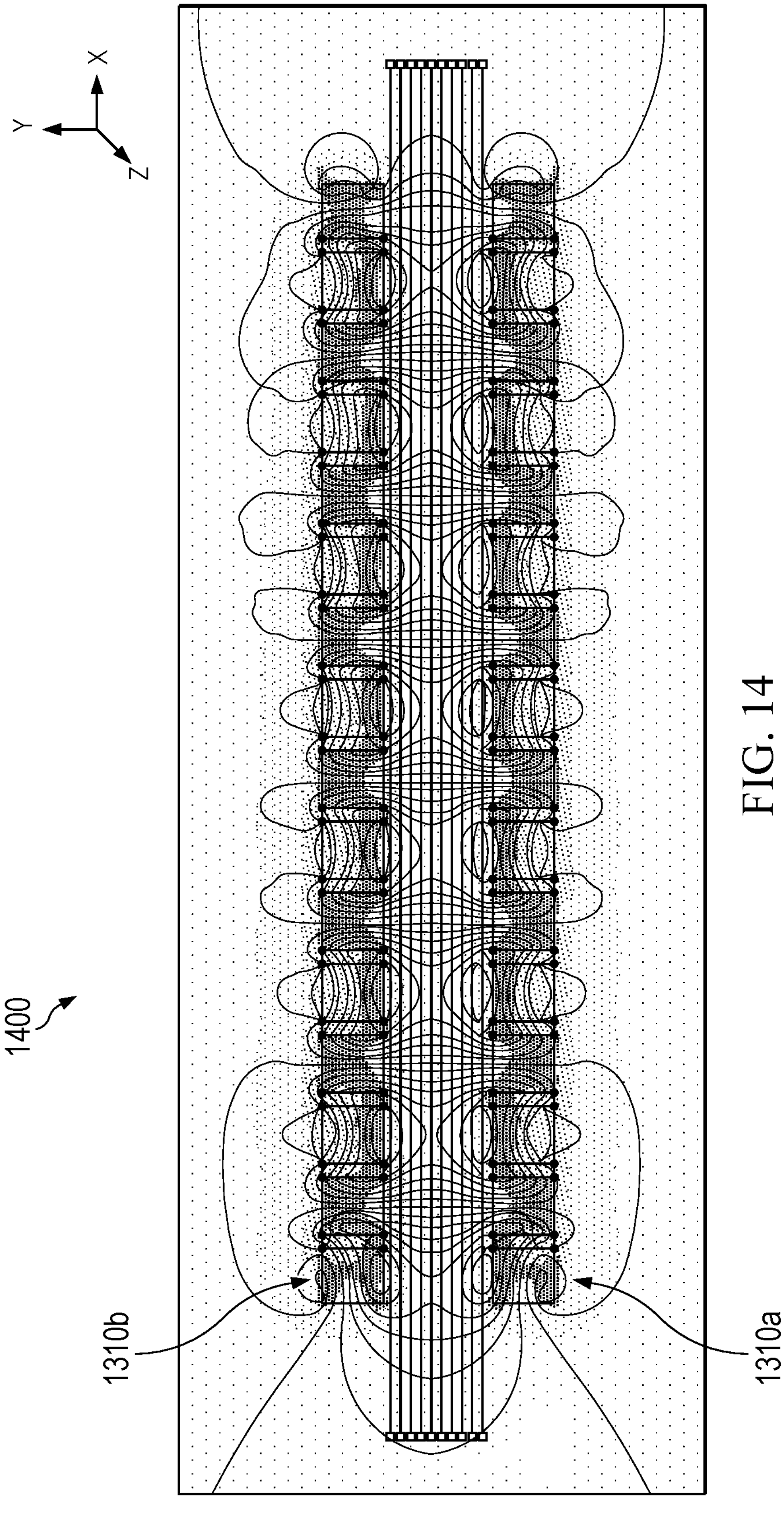
FIG. 14 illustrates a simulated magnetic field of the two Halbach arrays of FIG. 13A.

FIG. 14 shows a simulated magnetic field 1400 of the two sets of permanent magnets 1310$a$ and 1310$b$ spaced from each other same as that in FIG. 13A. The magnetic field 1400 can be simulated by a software tool for performing finite element simulation of magnetic field, e.g., FEMM (Finite Element Method Magnetics). In the simulation, as described in the particular embodiment, each set of permanent magnets has a length of 1.0 mm and a width of 1.0 mm. A magnet spacing is 0.25 mm. The magnet grade is N42H. The simulated field 1400 shows that the two Halbach arrays generate a stronger field in the active sides (inner sides) of the Halbach arrays and much weaker field on the other inactive sides (outer sides) of the Halbach arrays.

Figure 15A:
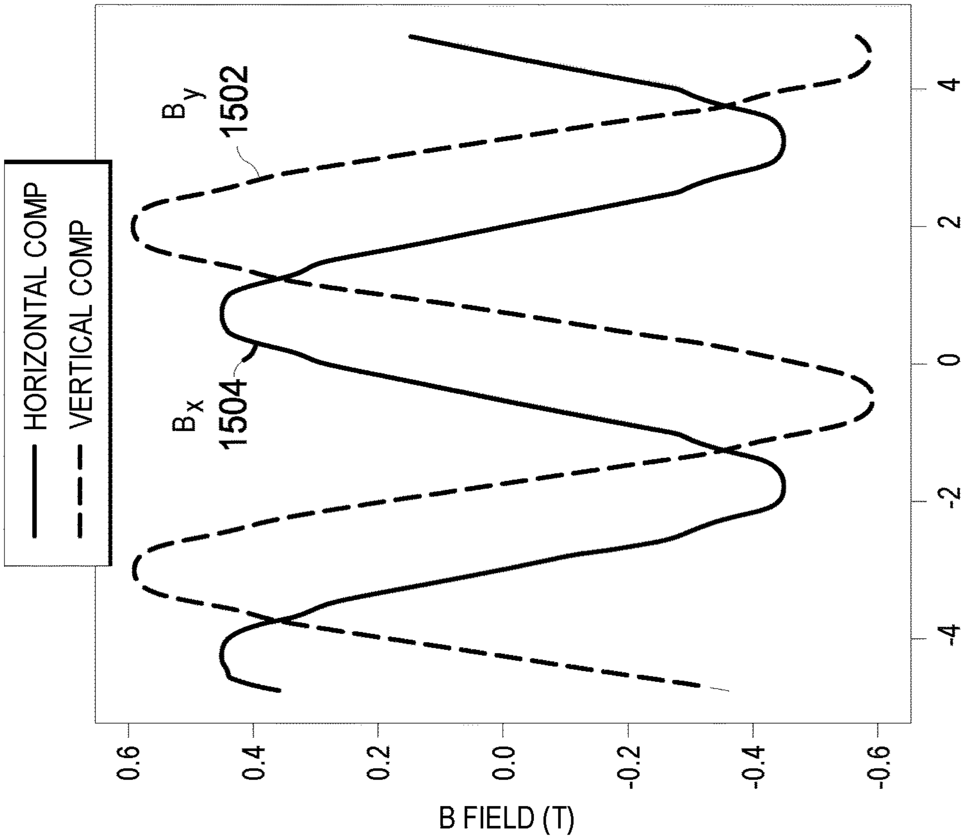
FIGS. 15A-C show the simulated magnetic field components of FIG. 14 at different positions between the two Halbach arrays.
Figure 15B:
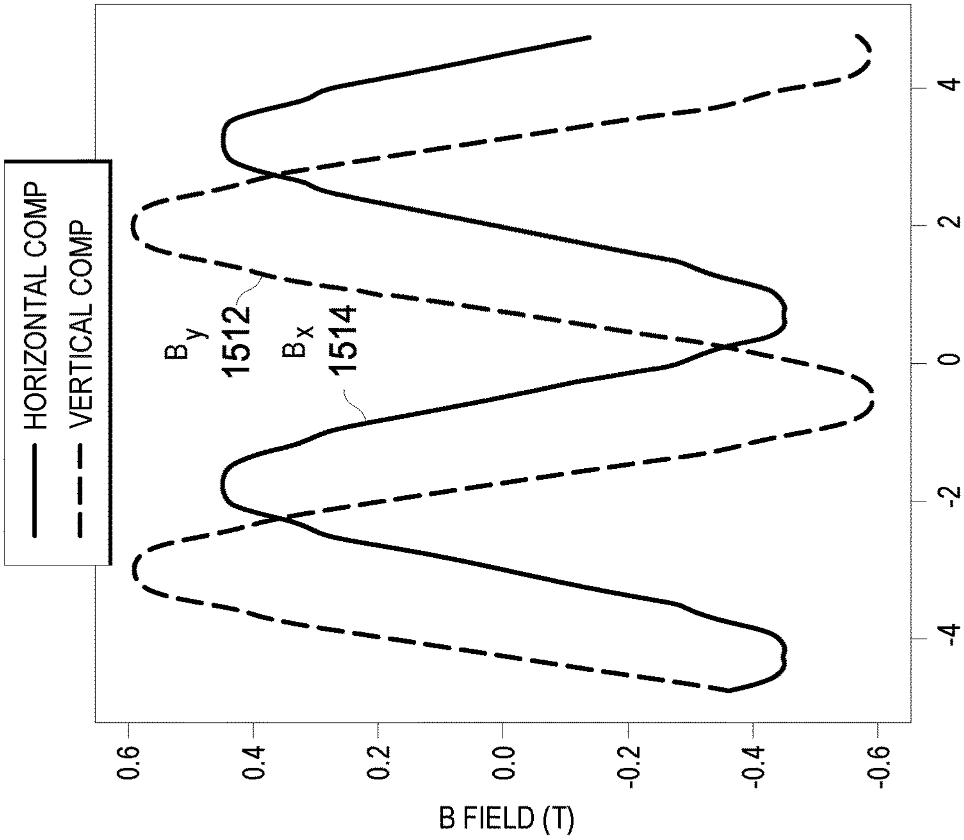
Figure 15C:
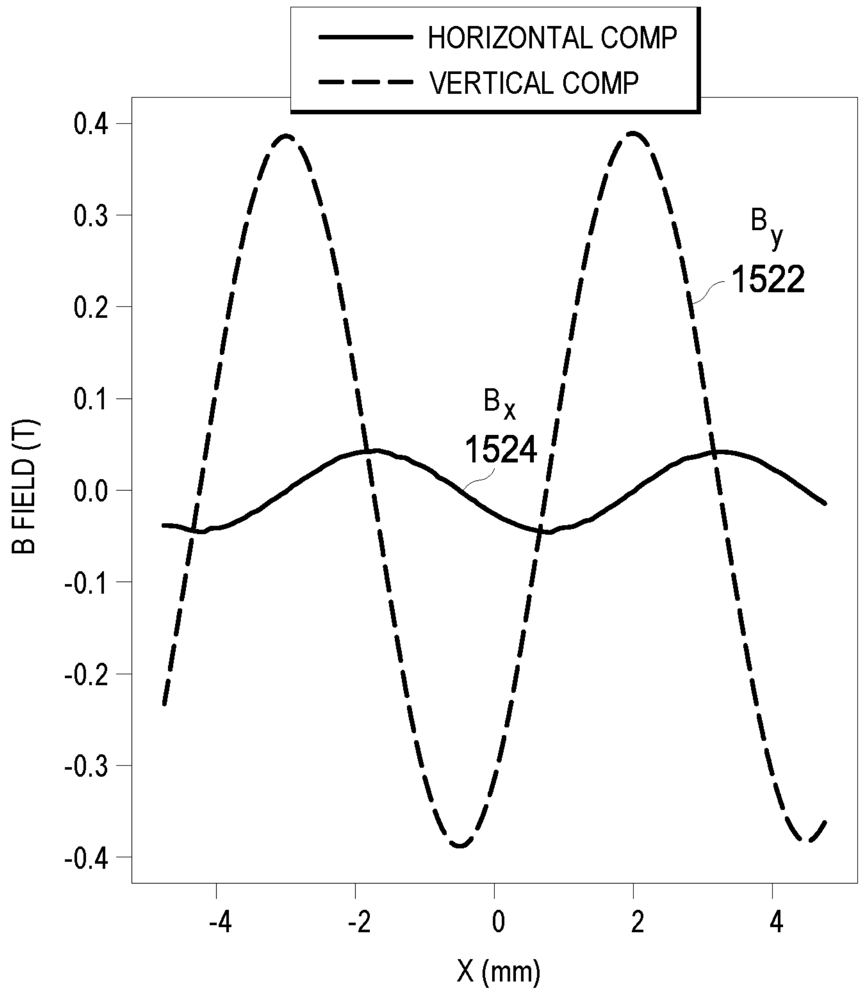

FIGS. 15A-C show components of the simulated magnetic field 1400 along the horizontal direction of the two Halbach arrays, i.e., x direction, at different distances along the vertical (axial) direction, i.e., y direction. Curves 1502, 1512, and 1522 show the y component $B_y$ of the magnetic field 1400, while curves 1504, 1514, and 1524 represent the x component $B_x$ of the magnetic field 1400. FIG. 15A shows the magnetic field at a distance of 0.2 mm from the first array of permanent magnets 1310$a$, that is, on the edge of the first side of the PCB 1320. FIG. 15B shows the magnetic field at a distance of 1.80 mm from the first array 1310$a$ or a distance of 0.2 mm from the second array 1310$b$ along the axial direction, that is, on the edge of the second side of the PCB 1320. FIG. 15C shows the magnetic field at a distance of 1.00 mm from the first array 1310$a$, that is, in the center of the PCB 1320. The curves show that the magnetic field components Bx and By are sinusoids that are 90 degree out of phase. The magnetic field 1400 is symmetric about the center of the PCB 1320. The field component Bx decays significantly faster than the field component By when the magnetic field is closer to the center of the PCB 1320. Accordingly, the total accumulated magnetic field has a much stronger y component By than x component Bx. As noted above, the magnetic field component By can contribute to the Lorentz force Fx that can rotate the cam ring.

Figure 16A:
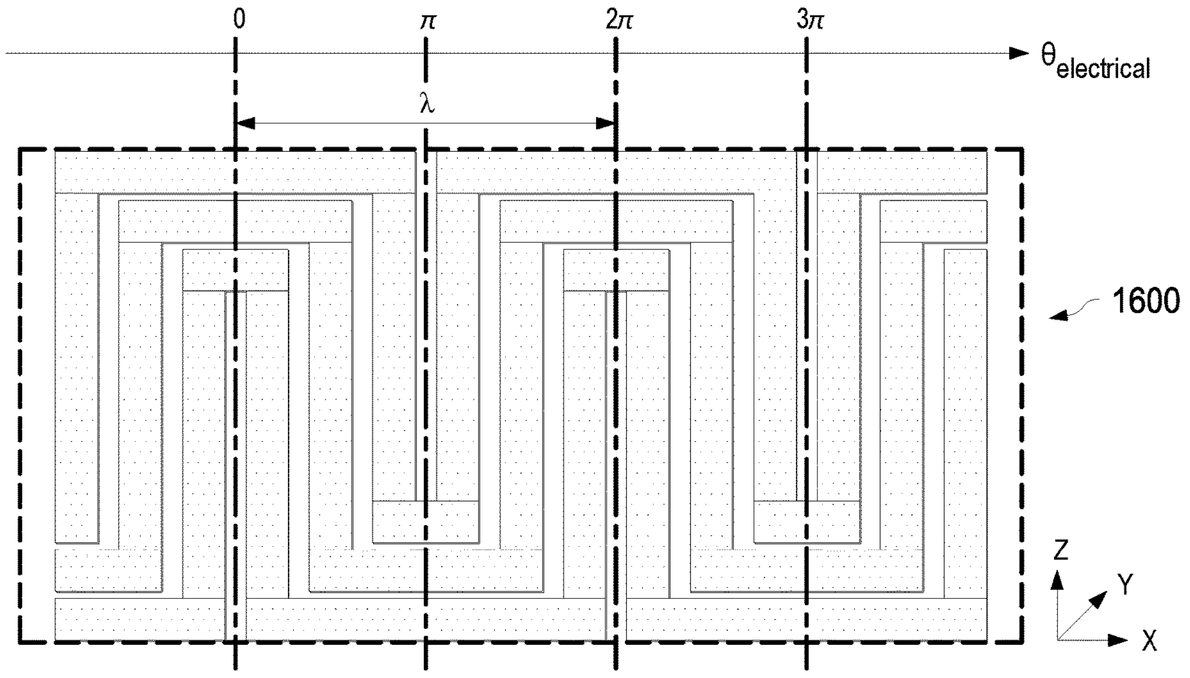
FIG. 16A is a schematic diagram of example printed electrical windings with a rectangular winding pattern.
Figure 16B:
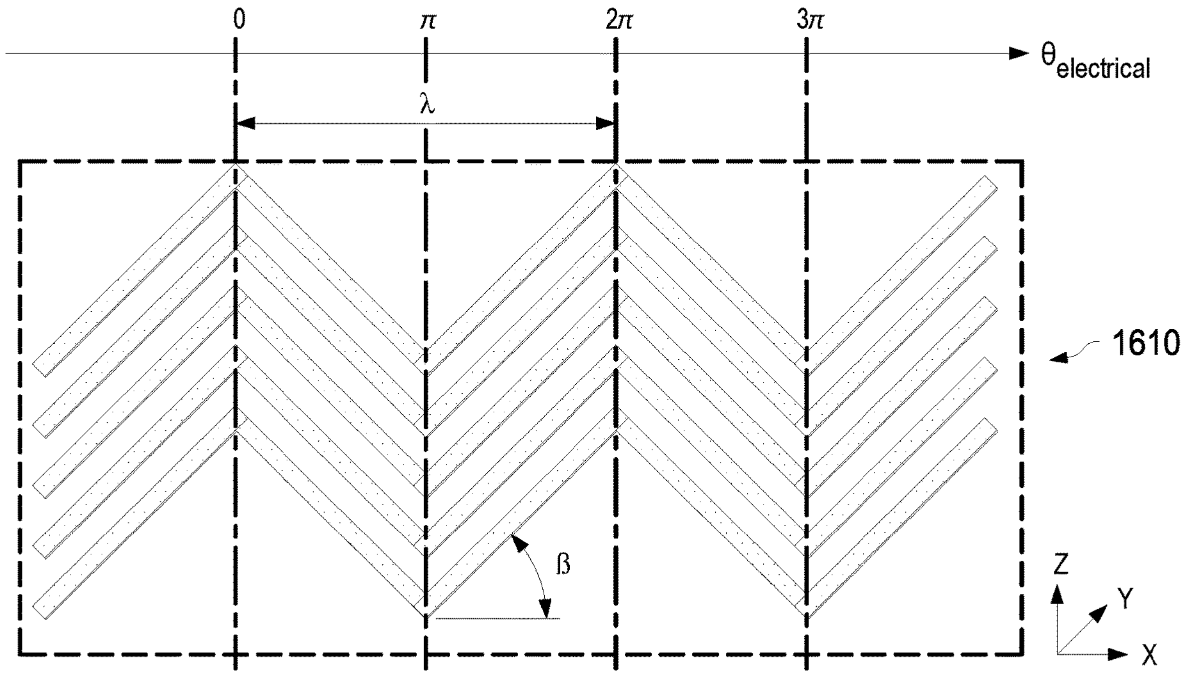
FIG. 16B is a schematic diagram of example printed electrical windings with a triangular winding pattern.

FIGS. 16A and 16B show examples of winding patterns of printed electrical windings on the multilayer PCB 1320 of FIG. 13A. The windings can be designed using either a rectangular pattern (FIG. 16A) or a triangular pattern (FIG. 16B). Note that only trace components along the radial direction (z direction) can produce useful torque. Trace components along the circumferential direction (x direction) do not contribute useful torque and can increase the winding resistance, dissipate heat, and reduce the efficiency of the motor 1300. Mathematical models and simulations can be developed to optimize the winding design of the two types of windings (rectangular windings in FIG. 16A and triangular windings in FIG. 16B) with respect so multiple design variables including: magnet spacing, magnet width (circumferential), magnet height (radial), and triangular winding angle (β).

For example, in FIG. 16A, the rectangular windings can have the following properties:

$$N_{turn} = \text{floor}[(\lambda/2)/(W_{trace} + S_{trace})], \tag{5}$$

$$Lz = 2N_{turn}(H_{PCB} - \lambda/2), \text{ and} \tag{6}$$

$$L_{total} = \lambda N_{turn}, \tag{7}$$

where λ represents a winding period, $N_{turn}$ represents a turn count of the electrical windings in the winding period, Lz represents a winding length along the z direction (or an effective length per winding period or per pole pair), $W_{trace}$ represents a width of the winding trace, $S_{trace}$ represents a spacing between the winding traces, and $H_{PCB}$ represents a height of the PCB board along the z direction.

For example, in FIG. 16B, the triangular windings can have the following properties:

$$N_{turn} = \text{floor}[(H_{PCB} - \lambda/2 * \tan(\beta))/(W_{trace} + S_{trace})], \tag{8}$$

$$Lz = 2N_{turn}(\lambda/2) * \tan(\beta), \text{ and} \tag{9}$$

$$L_{total} = 2N_{turn}(\lambda/2)/\cos(\beta), \tag{10}$$

where β represents a triangular winding angle.

An effective ratio $L_z/L_{total}$ can be determined based on the above expressions. The higher the effective ratio is, the more electrically efficient the windings are. The triangular windings configured in FIG. 16B can have a larger effective ratio $L_z/L_{total}$ than the rectangular windings configured in FIG. 16A. Additionally, as the expression (4) indicates, the Lorentz force $F_x$ is proportional to the effective winding length $L_z$. The larger the effective winding length $L_z$ is, the larger the force $F_x$ is. Thus, both the effective ratio $L_z/L_{total}$ and the effective winding length $L_z$ can be taken into consideration for designing the electrical winding.

Figure 17A:
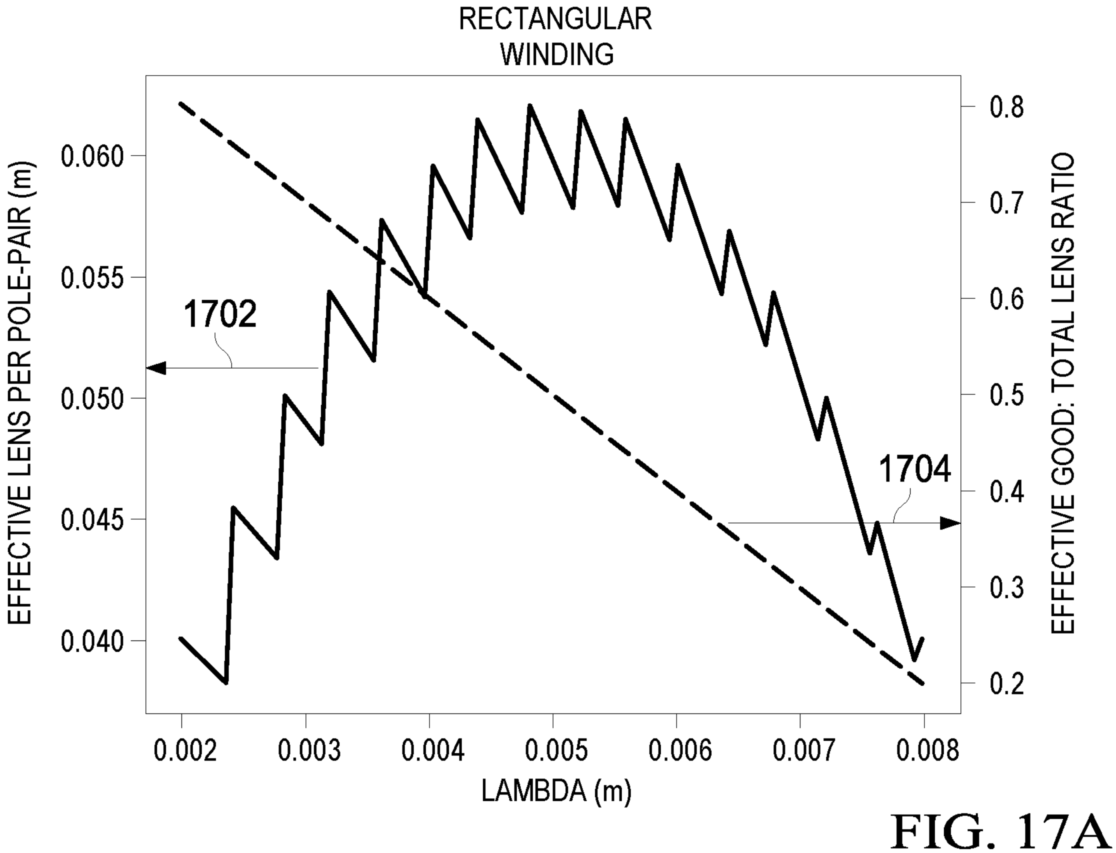
FIG. 17A illustrates respective relationships between a winding period $\lambda$ and an effective length per pole-pair and an effective ratio for a rectangular winding.

FIG. 17A shows respective relationships between the winding period λ and the effective length per pole-pair Lz and the effective ratio $L_z/L_{total}$ for the rectangular windings 1600. Curve 1702 shows the relationship between the winding period and the effective length per pole-pair. It indicates that the maximum effective length per pole-pair can be achieved to be about 60 mm when the winding period is about 5 mm. Curve 1704 shows that the effective ratio is inversely proportional to the winding period. When the winding period is about 5 mm, the effective ratio is about 0.5.

Figure 17B:
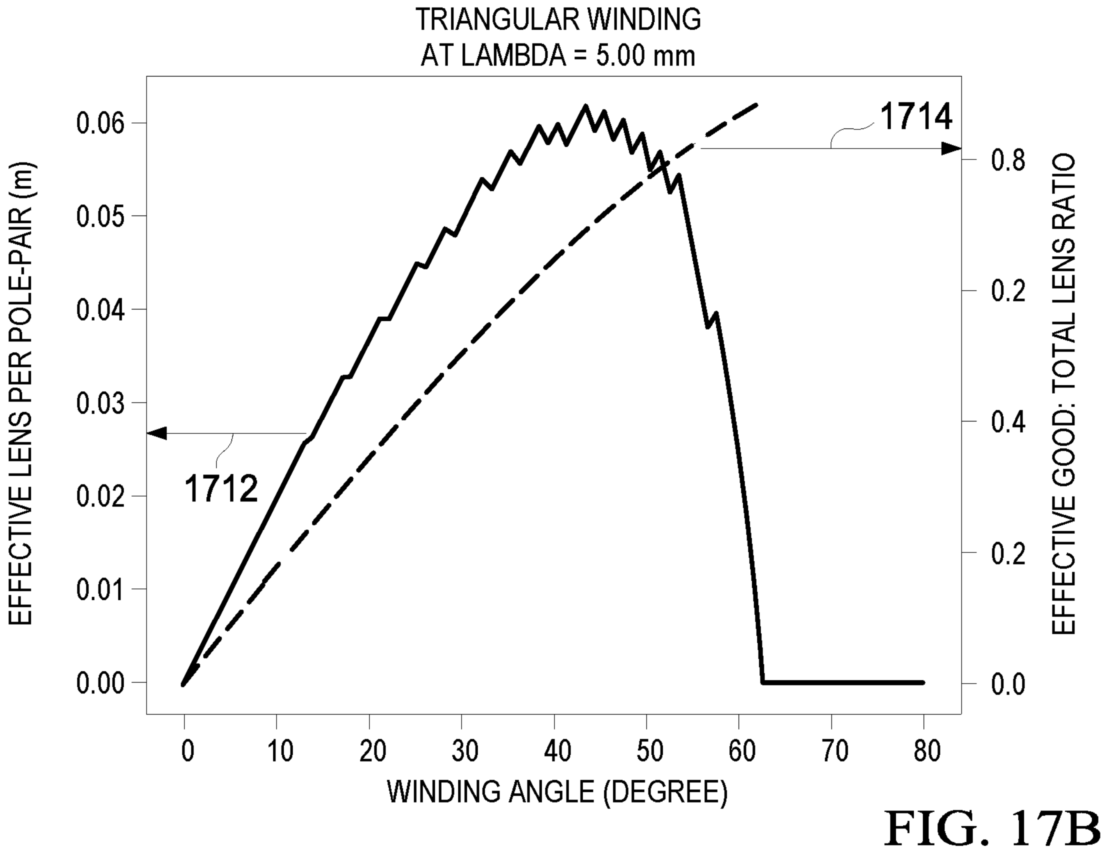
FIG. 17B illustrates respective relationships between a winding angle $\beta$ and an effective length per pole-pair and an effective ratio for a triangular winding.

FIG. 17B shows respective relationships between the winding angle β and the effective length per pole-pair and the effective ratio $L_z/L_{total}$ for the triangular windings 1610, when the winding period A is 5 mm. Curve 1712 shows the relationship between the winding angle and the effective length per pole-pair. It indicates that the maximum effective length per pole-pair can be achieved to be about 55 mm when the winding angle is 45°. Curve 1714 shows that the effective ratio increases with the winding angle. When the winding angle is 45°, the effective ratio is about 0.7. Thus, compared to the rectangular windings 1600, the triangular windings 1610 can have a slightly less effective length but a higher effective ratio. As the PCB height $H_{PCB}$ may be limited due to consideration of form factors of the motor, the triangular windings 1610 can have an overall better performance than the rectangular windings 1600.

Figure 18:
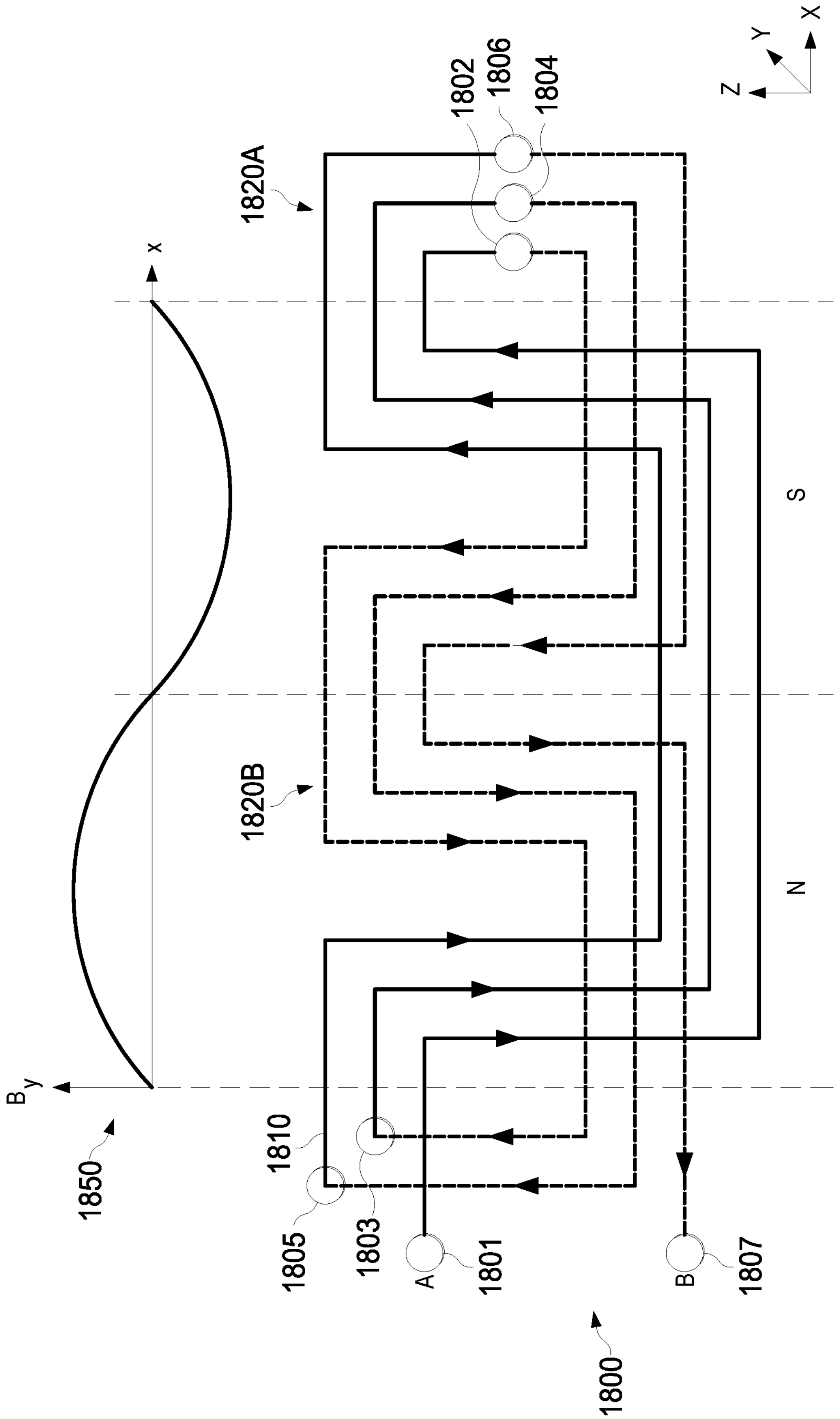
FIG. 18 is a schematic diagram of an example routing scheme for a single phase electrical winding on two layers.

Routing multiple windings in a fully circular stator may be straightforward. However, it may be challenging to route multiple windings along a finite arc-length. FIG. 18 shows a routing scheme 1800 that involves combining two layers into a single layer to form an electrical winding having one phase, e.g., phase A winding layer or phase B winding layer in FIG. 13A. The routing scheme can be implemented with buried vias in order to limit the excess circumference consumed by the PCB. The routing scheme 1800 can form windings on a limited arc-length.

As illustrated in FIG. 18, an electrical wire 1810, e.g., made of copper material, starts from an input port 1801 on a first layer and extends along a first path on the first layer to a first via 1802. Through the first via 1802, the wire 1810 goes to a second layer and extends along a second path on the second layer to a second via 1803. The first layer and the second layer can be separated by an additional layer. The second path and the first path can be offset by one quarter of a winding period. Through the second via 1803, the wire 1810 goes back to the first layer and extends along a third path on the first layer to a third via 1804. Through the third via 1804, the wire 1810 goes to the second layer and extends along a fourth path on the second layer to a fourth via 1805. Through the fourth via 1805, the wire 1810 goes to the first layer and extends along a fifth path on the first layer to a fifth via 1806. Through the fifth via 1806, the wire 1810 goes to the second layer and extends along a sixth path on the second layer to an output port 1807 on the second layer. The first path, the third path, and the fifth path have a similar shape and the wire 1810 extending along the first, third and fifth paths form a first winding 1820A on the first layer. The second path, the fourth path, and the sixth path have a similar shape and the wire 1810 extending along the second, fourth and sixth paths form a second winding 1820B on the second layer. Each of the first winding 1820A the second winding 1820B can be configured to be a rectangular winding, e.g., the rectangular winding 1600 in FIG. 16A, or a triangular winding, e.g., the triangular winding 1610 in FIG. 16B. For illustration purposes only, FIG. 18 shows that each of the first winding 1820A and the second winding 1820B is a rectangular winding.

A drive current can flow into the wire 1810 from the input port 1801 on the first layer and out from the output port 1807 on the second layer. The first winding 1820A and the second winding 1820B form a single phase winding 1820, e.g., phase A winding or phase B winding of FIG. 13A. For example, in the multilayer PCB 1320, the first winding 1820A can be on the first layer of the PCB, the second winding 1820B can be on the third layer of the PCB, and the first winding 1820A and the second winding 1820B can form phase B winding. Similarly, a winding on the second layer of the PCB and a winding on the fourth layer of the PCB can form phase A winding. Drive currents for phase A and phase B electrical windings can be sinusoidal currents with π/2 rad out of phase, such that the stator can interact with the rotor to generate a constant force along the x direction.

Each of the first winding 1820A and the second winding 1820B can be arranged to correspond to a distribution 1850 of a magnetic field By along the x direction of a rotor, e.g., the rotor including the two arrays of permanent magnets 1310*a* and 1310*b* in FIG. 13A. The distribution 1850 is a sinusoidal curve with a magnetic period identical to a winding period of each of the first winding 1820A and the second winding 1820B. As illustrated in FIG. 18, the magnetic period corresponds to a positive magnetic field (N) and a negative magnetic field (S).

In some embodiments, the stator 1320 can be designed to be a 2 phase system stator with the following parameters: a total arc angle used on the cam ring 1302 is 180 degree; PCB layer count is 16; PCB annular/radial height is 5 mm; winding trace width and spacing are 100 μm and 100 μm, respectively; trace thickness 2 oz Cu pour (2.8 mil); magnet width along circumferential direction (x direction) is 1 mm; magnet spacing is 0.25 mm; magnetic grade is NdFEB N42H; average sinusoidal axial flux density amplitude is 0.5 T; and a winding type is triangular with a winding angle of 45 degree.

The magnetic flux densities can be simulated, for example, in FEMM, and the performance of the motor can be derived in numerical simulation. The torque constant shape can match expected results and the per-phase motor performance can be calculated. For example, torque constant $K_T$ can be 80 mNm/A, the pole pair count of the Halbach array can be 12, electrical speed can be 12 times of a mechanical speed, a per-phase trace resistance can be 32.6 Ohm. An average efficiency of the motor given the torque load & actuation speeds can be about 5.9%. To maximize the efficiency, a gear ratio of the motor and the torque constant of the motor can be maximized.

A driver source can have the following characteristics:

$$I_{max} = T_{max}/K_T, \tag{11}$$

$$V_{max} = w_{electrical\text{-}max}(K_v) + I_{max}R_{phase} \tag{12}$$

where torque constant $K_T$ and speed constant $K_v$ are the same for permanent magnet rotors, $T_{max}$ represents maximum torque, $w_{electrical\text{-}max}$ represents maximum angular velocity, and $R_{phase}$ represents the per-phase trace resistance. With the above parameters, $I_{max}$ can be 250 mA, and $V_{max}$ can be 9 V. Moreover, the array of permanent magnets of the rotor can have a weight of about 3.6 g, with the magnet pole count being 96 and the magnet material density being 7.5 mg/mm$^3$.

There can be three methods to derive the torque constant. In the first method, the Lorentz force for each wire is computed and summed up, and then the rotor angle between 0 and 2π is varied to get the variation. In the second method, the induced voltage in the windings via Faraday's law is computed by moving the rotor at a fixed speed. The torque constant $K_T$ and the speed constant $K_v$ are the same, so the speed constant $K_v$ can be used to derive the torque constant $K_T$. In the third method, the flux linkage (integrating flux density over turn area) of each turn vs rotor angle is computed and summed, and then the derivative of the flux linkage with respect to the rotor angle can be taken to get the torque constant. The third method can be equivalent to the second method.

Exemplary Process

Figure 19:
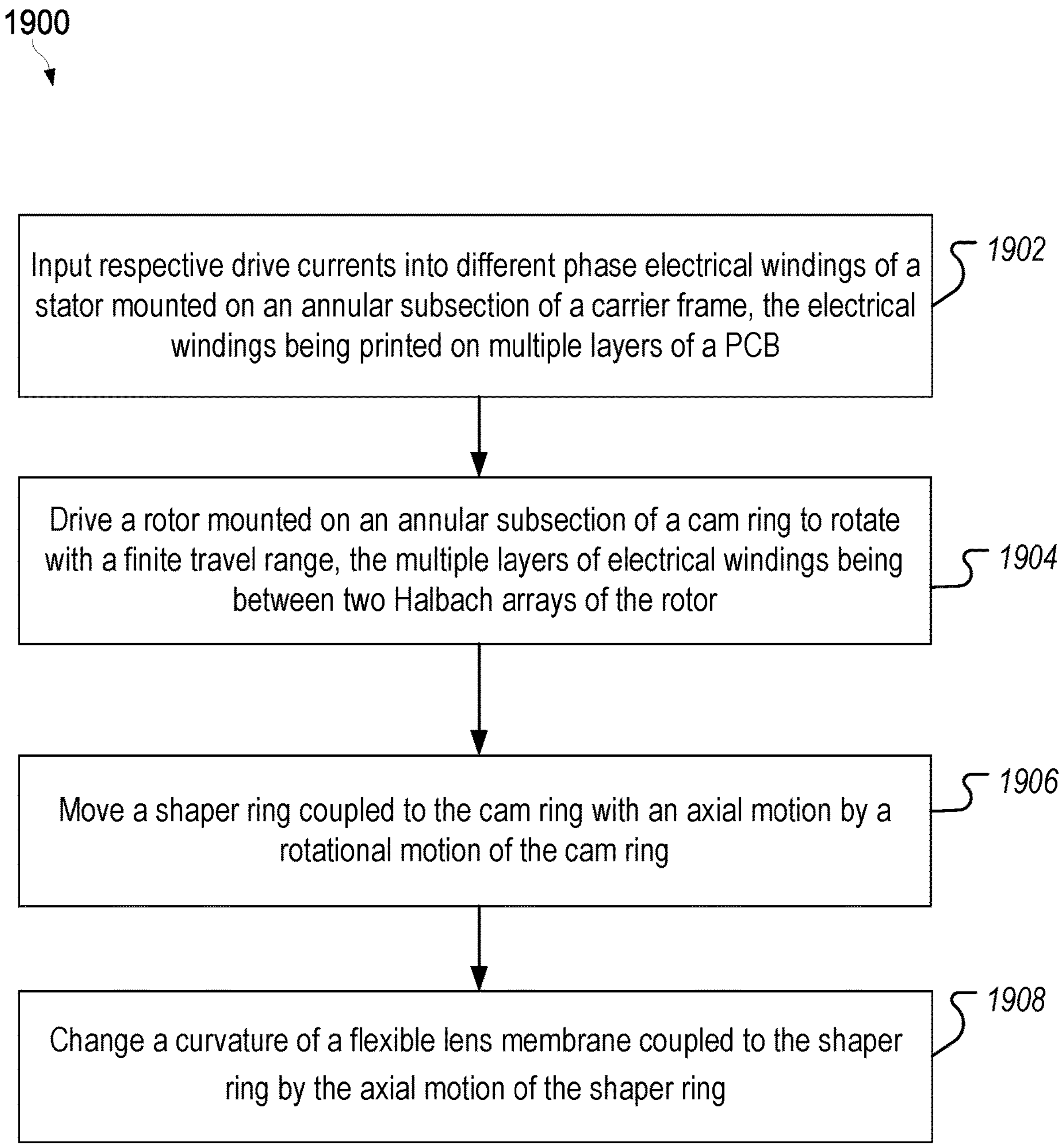
FIG. 19 is a flow diagram illustrating an example of a process of operating an optical system using an annular axial flux motor as an actuator.

FIG. 19 is a flow diagram illustrating an example of a process 1900 of operating a system using an annular axial flux motor as an actuator. The system can be a liquid lens assembly, e.g., the liquid lens assembly 300 of FIG. 3A-3B or 402 of FIG. 4, a variable focus assembly, e.g., the ILA 210 or OLA 220 of FIG. 2, a variable focus assembly in the optical elements 120 of FIG. 1, or a variable focus assembly 400 of FIG. 4. The annular axial flux motor can be the motor 1300 of FIGS. 13A-13B.

In some embodiments, the annular axial flux motor includes a stator mounted on a first annular subsection of a carrier frame and a rotor mounted on a second annular subsection of a cam ring interior to the carrier frame. The first annular subsection of the carrier frame corresponds to the second annular subsection, such that the stator can interact with the rotor. The cam ring is rotatable with respect to the carrier frame. The cam ring can be made of a non-ferromagnetic material.

The stator includes multiple phases (2-phase, 3-phase, or more phases) electrical windings printed on multiple layers of a printed circuit board (PCB). The printed electrical windings extend along a circumferential direction of the first annular subsection. The multiple layers are stacked with one another along an axial direction of the first annular subsection. Each phase electrical windings of the stator can be configured to have a same rotor-dependent torque constant, such that the stator is configured to generate a constant torque to drive the rotor.

In some embodiments, the stator includes 2-phase electrical windings. The two phase electrical windings can have a same winding pattern and be offset by a quarter of a winding period. The winding pattern can be a rectangular pattern or a triangular pattern (e.g., with a triangular winding angle of 45 degree).

In some embodiments, each of the multiple layers corresponds to a respective phase electrical winding, and the respective phase electrical windings with different phases alternate in the multiple layers.

In some embodiments, the multiple layers of printed electrical windings comprise a first layer, a second layer, a third layer, and a fourth layer sequentially stacked together along the axial direction, and printed electrical windings on the first layer and the third layer are formed by a first continuous wire to be a first phase electrical winding, and printed electrical windings on the second layer and the fourth layer are formed by a second continuous wire to be a second phase electrical winding.

In a particular embodiment, the first wire is printed starting from an input port of the first layer, extending along a first path on the first layer to a first via, through which the first wire goes to the third layer and extends along a second path on the third layer to a second via, through which the first wire goes back to the first layer and extends along a third path on the first layer to a third via, through which the first wire goes to the third layer and extends along a fourth path on the third layer to a fourth via, through which the first wire goes to the first layer and extends along a fifth path on the first layer to a fifth via, through which the first wire goes to the third layer and extends along a sixth path on the third layer to an output port of the third layer. The first wire extending along the first path, the third path, and the fifth path forms a first electrical winding on the first layer, the first wire extending along the second path, the fourth path, and the sixth path forms a second electrical winding on the third layer, and the first electrical winding and the second electrical winding form the first phase electrical winding. The first electrical winding and the second electrical winding have a same winding pattern offset by a quarter of a winding period, and the first via, the third via, and the fifth via are adjacent to each other, while the second via and the fourth via are adjacent to each other.

The rotor can include arrays of permanent magnets mounted on the second annular subsection of the cam ring. In some embodiments, the rotor includes two Halbach arrays mounted on the second annular subsection and spaced from each other along an axial direction of the second annular subsection. Each of the Halbach arrays is configured to have a stronger magnetic field on an active side of the Halbach array than an inactive, opposite side of the Halbach array with respect to the axial direction. The magnetic field of the inactive side of the Halbach array is nearly identical to zero.

In some embodiments, the multiple layers of printed electrical windings are inserted between the two Halbach arrays of the rotor along the axial direction, with the active sides of the Halbach arrays facing to opposite sides of the multiple layers and being spaced with nominal gaps.

The nominal gaps can have a same width along the axial direction. The two Halbach arrays are configured to generate a symmetrical magnetic field with respect to a center of the multiple layers of the PCB along the axial direction, and an axial component of the magnetic field along the axial direction is substantially larger than a tangential component of the magnetic field along a tangential direction of the second annular subsection.

The two Halbach arrays can have different arrangements of magnetic poles and are configured to have the active sides facing to the opposite sides of the multiple layers of printed electrical windings. Each of the Halbach arrays can include periodic units of permanent magnets arranged on the second annular subsection along the circumferential direction. Each of the periodic units can include rows of magnet pole pairs. Adjacent rows can be separated from one another with a magnetic space along the circumferential direction, and each magnet pole pair can include an N pole and an S pole.

In some embodiments, in the first Halbach array, each of the periodic units includes four rows of magnet pole pairs having: a first row having N pole and S pole vertically and sequentially stacked along the axial direction, a second row having S pole and N pole horizontally and sequentially stacked along the circumferential direction, a third row having S pole and N pole vertically and sequentially stacked along the axial direction, and a fourth row having N pole and S pole horizontally and sequentially stacked along the circumferential direction.

The second Halbach array has a different arrangement from the first Halbach array. Each of the periodic units in the second Halbach array can include four rows of magnet pole pairs having: a vertical N pole and a vertical S pole sequentially stacked along the axial direction on a first row, a horizontal N pole and a horizontal S pole sequentially stacked along the tangential direction on a second row, a vertical S pole and vertical N pole sequentially stacked along the axial direction on a third row, a horizontal S pole and a horizontal N pole sequentially stacked along the tangential direction on a fourth row.

The electrical windings of the stator can have a height along a radial direction of the structure that is substantially same as a height of the Halbach arrays of permanent magnets along the radial direction. The electrical windings can be configured such that a winding period of the electrical windings corresponds to a magnetic period of the magnetic field of the rotor.

At 1902, respective drive currents are input into different phase electrical windings of the stator. The respective drive currents have a phase difference with a predetermined degree with respect to each other. For example, for 2-phase electrical windings, the drive currents are sinusoidal currents with a phase difference of $\pi/2$; for 3-phase electrical windings, the drive current are sinusoidal currents with a phase difference of $2\pi/3$.

In some embodiments, the rotor generates a magnetic field having a sinusoidal shape corresponding to positions of magnetic pole pairs of the rotor, and the stator is driven by a sinusoidal current varying corresponding to the positions of the magnet pole pairs of the rotor.

At 1904, the rotor mounted on the second annular subsection of the cam ring is driven to rotate with a finite travel range about an axis of the cam ring. The electrical windings input with the drive currents can generate a time-varying magnetic field which can interact with the magnetic field of the rotor to generate a Lorentz force. Particularly, an axial component of the magnetic field along the axial direction of the second annular subsection can contribute to the Lorentz force along a tangential direction of the second annular subsection, which can cause a rotation motion of the rotor with the cam ring.

At 1906, a shaper ring coupled to the cam ring is moved with an axial motion along the axial direction by the rotational motion of the cam ring. The shaper ring can be interior to the cam ring. Mechanical features of the shaper ring can be engaged with mechanical features of the cam ring such that the rotational motion of the cam ring results in the axial motion of the shaper ring.

At 1908, a curvature of a flexible lens membrane coupled to the shaper ring is changed by the axial motion of the shaper ring. The flexible lens membrane and the shaper ring can be included in a liquid lens assembly. The liquid lens assembly can include incompressible fluid encapsulated between the shaper ring, the flexible lens membrane, a refractive component, and a flexible annular membrane. When the shaper ring is axially moved with the axial motion towards the refractive component, the incompressible fluid is pushed towards the flexible lens membrane to cause the curvature change.

Various example embodiments of the present disclosure are described herein. Reference is made to these examples in a non-limiting sense. They are provided to illustrate more broadly applicable aspects of the present disclosure. Various changes may be made to the present disclosure described and equivalents may be substituted without departing from the true spirit and scope of the present disclosure. In addition, many modifications may be made to adapt a particular situation, material, composition of matter, process, process act(s) or step(s) to the objective(s), spirit or scope of the present disclosure. Further, as will be appreciated by those with skill in the art that each of the individual variations described and illustrated herein has discrete components and features which may be readily separated from or combined with the features of any of the other several embodiments without departing from the scope or spirit of the present disclosures. All such modifications are intended to be within the scope of claims associated with this disclosure.

The present disclosure includes methods that may be performed using the subject devices. The methods may comprise the act of providing such a suitable device. Such provision may be performed by the end user. In other words, the "providing" act may include one or more steps in which the end user may obtain, access, approach, position, set-up, activate, power-up or otherwise act to provide the requisite device in the subject method. Methods recited herein may be carried out in any order of the recited events which is logically possible, as well as in the recited order of events.

Example aspects of the present disclosure, together with details regarding material selection and manufacture have been set forth above. As for other details of the present disclosure, these may be appreciated in connection with the above-referenced patents and publications as well as generally known or appreciated by those with skill in the art. The same may hold true with respect to method based aspects of the present disclosure in terms of additional acts as commonly or logically employed.

In addition, though the present disclosure has been described in reference to several examples optionally incorporating various features, the present disclosure is not to be limited to that which is described or indicated as contemplated with respect to each variation of the present disclosure. Various changes may be made to the present disclosure described and equivalents (whether recited herein or not included for the sake of some brevity) may be substituted without departing from the true spirit and scope of the present disclosure. In addition, where a range of values is provided, it is understood that every intervening value, between the upper and lower limit of that range and any other stated or intervening value in that stated range, is encompassed within the present disclosure.

Also, it is contemplated that any optional feature of the inventive variations described may be set forth and claimed independently, or in combination with any one or more of the features described herein. Reference to a singular item, includes the possibility that there are plural of the same items present. More specifically, as used herein and in claims associated hereto, the singular forms "a," "an," "said," and "the" include plural referents unless the specifically stated otherwise. In other words, use of the articles allow for "at least one" of the subject item in the description above as well as claims associated with this disclosure. It is further noted that such claims may be drafted to exclude any optional element. As such, this statement is intended to serve as antecedent basis for use of such exclusive terminology as "solely," "only" and the like in connection with the recitation of claim elements, or use of a "negative" limitation. Without the use of such exclusive terminology, the term "comprising" in claims associated with this disclosure shall allow for the inclusion of any additional element—irrespective of whether a given number of elements are enumerated in such claims, or the addition of a feature could be regarded as transforming the nature of an element set forth in such claims. Except as specifically defined herein, all technical and scientific terms used herein are to be given as broad a commonly understood meaning as possible while maintaining claim validity.

The breadth of the present disclosure is not to be limited to the examples provided and/or the subject specification, but rather only by the scope of claim language associated with this disclosure.

The invention claimed is:

1. An annular axial flux motor comprising:

a rotor comprising an array of permanent magnets mounted on a first annular subsection of a rotatable structure, the first annular subsection of the rotatable structure being formed with a limited arc length less than a full circle, the array of permanent magnets extending along a circumferential direction of the first annular subsection and being configured to have a stronger magnetic field on an active side of the array than an inactive, opposite side of the array with respect to an axial direction of the first annular subsection; and a stator comprising multiple layers of printed electrical windings on a printed circuit board (PCB) mounted on a second annular subsection of a carrier that corresponds to the first annular subsection, the electrical windings extending along the circumferential direction, the multiple layers of the PCB being stacked along the axial direction, the active side of the array of permanent magnets facing one side of the multiple layers of the PCB and being spaced with a nominal gap, wherein the stator is configured to be energized to generate a torque to drive the rotor with the rotatable structure to rotate forward or backward within a limited angle range less than a full circle with respect to the carrier, and wherein the array of permanent magnets is a Halbach array, wherein the Halbach array comprises periodic units of permanent magnets arranged on the first annular subsection along the circumferential direction, each of the periodic units comprises rows of magnet pole pairs, and each of the periodic units comprises four rows of magnet pole pairs, adjacent rows being separated from one another with a magnetic space along the circumferential direction, each magnet pole pair comprising an N pole and an S pole, and wherein the four rows comprise:

a first row having N pole and S pole vertically and sequentially stacked along the axial direction, a second row having S pole and N pole horizontally and sequentially stacked along the circumferential direction, a third row having S pole and N pole vertically and sequentially stacked along the axial direction, and a fourth row having N pole and S pole horizontally and sequentially stacked along the circumferential direction.

2. The annular axial flux motor of claim 1, wherein the rotor comprises two arrays of permanent magnets mounted on the first annular subsection and spaced from each other along the axial direction, wherein the multiple layers of printed electrical windings on the PCB are arranged between the two arrays of permanent magnets, active sides of the two arrays facing opposite sides of the multiple layers with respect to the axial direction, and wherein nominal gaps between the active sides of respective Halbach arrays and the opposite sides of the multiple layers have a same width along the axial direction.

3. The annular axial flux motor of claim 2, wherein the two arrays of permanent magnets are configured to generate a symmetrical magnetic field with respect to a center of the multiple layers of the PCB, wherein an axial component of the symmetrical magnetic field along the axial direction is substantially larger than a tangential component of the symmetrical magnetic field along a tangential direction of the first annular subsection, wherein each of the two arrays of permanent magnets is a respective Halbach array, wherein the respective Halbach arrays have different arrangements of magnetic poles and are configured to have the active sides opposite to the two sides of the multiple layers of printed electrical windings, and wherein the stator comprises multiple phase electrical windings, and wherein each of the multiple phase electrical windings of the stator is configured to have a same rotor-dependent torque constant, such that the stator is configured to generate a constant torque to drive the rotor.

4. The annular axial flux motor of claim 1, wherein the electrical windings have a height along a radial direction of the structure that is substantially same as a height of the array of permanent magnets along the radial direction, and wherein the electrical windings are configured such that a winding period of the electrical windings corresponds to a magnetic period of a magnetic field of the rotor.

5. The annular axial flux motor of claim 1, wherein the stator comprises 2-phase electrical windings configured to be driven with sinusoidal drive currents with a phase difference of $\pi/2$, wherein each of the multiple layers corresponds to a respective phase electrical winding, and the respective phase electrical windings with different phases alternate in the multiple layers, and wherein the 2-phase electrical windings have a same winding pattern and are offset by a quarter of a winding period.

6. The annular axial flux motor of claim 5, wherein the multiple layers of printed electrical windings comprise a first layer, a second layer, a third layer, and a fourth layer sequentially stacked together along the axial direction, wherein printed electrical windings on the first layer and the third layer are formed by a first continuous wire to be a first phase electrical winding, and printed electrical windings on the second layer and the fourth layer are formed by a second continuous wire to be a second phase electrical winding, wherein the first wire is printed starting from an input port of the first layer, extending along a first path on the first layer to a first via, through which the first wire goes to the third layer and extends along a second path on the third layer to a second via, through which the first wire goes back to the first layer and extends along a third path on the first layer to a third via, through which the first wire goes to the third layer and extends along a fourth path on the third layer to a fourth via, through which the first wire goes to the first layer and extends along a fifth path on the first layer to a fifth via, through which the first wire goes to the third layer and extends along a sixth path on the third layer to an output port of the third layer, wherein the first wire extending along the first path, the third path, and the fifth path forms a first electrical winding on the first layer, the first wire extending along the second path, the fourth path, and the sixth path forms a second electrical winding on the third layer, and the first electrical winding and the second electrical winding form the first phase electrical winding, wherein the first electrical winding and the second electrical winding have a same winding pattern offset by a quarter of a winding period, and wherein the first via, the third via, and the fifth via are adjacent to each other, and the second via and the fourth via are adjacent to each other.

7. The annular axial flux motor of claim 1, wherein the stator comprises 3-phase electrical windings configured to be driven with sinusoidal drive currents that are 2π/3 out of phase relative to one another.

8. The annular axial flux motor of claim 1, wherein the electrical windings have a rectangular winding pattern or a triangular winding pattern.

9. The annular axial flux motor of claim 1, wherein the rotor is configured to generate a magnetic field having a sinusoidal shape corresponding to positions of magnetic pole pairs of the rotor, and wherein the stator is configured to be driven by a sinusoidal current varying corresponding to the positions of the magnet pole pairs of the rotor.

10. An annular axial flux motor comprising:

a rotor comprising an array of permanent magnets mounted on a first annular subsection of a rotatable structure, the first annular subsection of the rotatable structure being formed with a limited arc length less than a full circle, the array of permanent magnets extending along a circumferential direction of the first annular subsection and being configured to have a stronger magnetic field on an active side of the array than an inactive, opposite side of the array with respect to an axial direction of the first annular subsection; and a stator comprising multiple layers of printed electrical windings on a printed circuit board (PCB) mounted on a second annular subsection of a carrier that corresponds to the first annular subsection, the electrical windings extending along the circumferential direction, the multiple layers of the PCB being stacked along the axial direction, the active side of the array of permanent magnets facing one side of the multiple layers of the PCB and being spaced with a nominal gap, wherein the stator is configured to be energized to generate a torque to drive the rotor with the rotatable structure to rotate forward or backward within a limited angle range less than a full circle with respect to the carrier, wherein the stator comprises 2-phase electrical windings configured to be driven with sinusoidal drive currents with a phase difference of π/2, wherein each of the multiple layers corresponds to a respective phase electrical winding, and the respective phase electrical windings with different phases alternate in the multiple layers, and wherein the 2-phase electrical windings have a same winding pattern and are offset by a quarter of a winding period.

11. The annular axial flux motor of claim 10, wherein the array of permanent magnets is a Halbach array, and wherein the Halbach array comprises periodic units of permanent magnets arranged on the first annular subsection along the circumferential direction, each of the periodic units comprising rows of magnet pole pairs.

12. The annular axial flux motor of claim 11, wherein each of the periodic units comprises four rows of magnet pole pairs, adjacent rows being separated from one another with a magnetic space along the circumferential direction, each magnet pole pair comprising an N pole and an S pole, and wherein the four rows comprise:

a first row having N pole and S pole vertically and sequentially stacked along the axial direction, a second row having S pole and N pole horizontally and sequentially stacked along the circumferential direction, a third row having S pole and N pole vertically and sequentially stacked along the axial direction, and a fourth row having N pole and S pole horizontally and sequentially stacked along the circumferential direction.

13. The annular axial flux motor of claim 10, wherein the rotor comprises two arrays of permanent magnets mounted on the first annular subsection and spaced from each other along the axial direction, wherein the multiple layers of printed electrical windings on the PCB are arranged between the two arrays of permanent magnets, active sides of the two arrays facing opposite sides of the multiple layers with respect to the axial direction, and wherein nominal gaps between the active sides of respective Halbach arrays and the opposite sides of the multiple layers have a same width along the axial direction.

14. The annular axial flux motor of claim 13, wherein the two arrays of permanent magnets are configured to generate a symmetrical magnetic field with respect to a center of the multiple layers of the PCB, wherein an axial component of the symmetrical magnetic field along the axial direction is substantially larger than a tangential component of the symmetrical magnetic field along a tangential direction of the first annular subsection, wherein each of the two arrays of permanent magnets is a respective Halbach array, and wherein the respective Halbach arrays have different arrangements of magnetic poles and are configured to have the active sides opposite to the two sides of the multiple layers of printed electrical windings, and wherein the stator comprises multiple phase electrical windings, and wherein each of the multiple phase electrical windings of the stator is configured to have a same rotor-dependent torque constant, such that the stator is configured to generate a constant torque to drive the rotor.

15. The annular axial flux motor of claim 10, wherein the electrical windings have a height along a radial direction of the structure that is substantially same as a height of the array of permanent magnets along the radial direction, and wherein the electrical windings are configured such that a winding period of the electrical windings corresponds to a magnetic period of a magnetic field of the rotor.

16. The annular axial flux motor of claim 10, wherein the stator comprises 3-phase electrical windings configured to be driven with sinusoidal drive currents that are 2π/3 out of phase relative to one another.

17. The annular axial flux motor of claim 10, wherein the electrical windings have a rectangular winding pattern or a triangular winding pattern.

18. The annular axial flux motor of claim 10, wherein the rotor is configured to generate a magnetic field having a sinusoidal shape corresponding to positions of magnetic pole pairs of the rotor, and wherein the stator is configured to be driven by a sinusoidal current varying corresponding to the positions of the magnet pole pairs of the rotor.

* * * * *